(12) United States Patent
Tanaka

(10) Patent No.: US 8,902,285 B2
(45) Date of Patent: Dec. 2, 2014

(54) WIRELESS COMMUNICATION APPARATUS FOR TRANSMITTING INFORMATION ON CONTROL TIMING AND DETECTING CAUSE OF TRANSMISSION TIMING ADJUSTMENT

(75) Inventor: Koichiro Tanaka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 468 days.

(21) Appl. No.: 13/440,401

(22) Filed: Apr. 5, 2012

(65) Prior Publication Data

US 2012/0188339 A1  Jul. 26, 2012

Related U.S. Application Data

(63) Continuation of application No. PCT/JP2011/004235, filed on Jul. 27, 2011.

(30) Foreign Application Priority Data

Jul. 29, 2010 (JP) ................................ 2010-169995

(51) Int. Cl.
- *H04N 13/00* (2006.01)
- *H04N 13/04* (2006.01)
- *H04N 19/597* (2014.01)

(52) U.S. Cl.
CPC ....... *H04N 13/0438* (2013.01); *H04N 13/0497* (2013.01); *H04N 19/00769* (2013.01)
USPC .......................................................... 348/43

(58) Field of Classification Search
CPC ................................................ H04N 13/0055
USPC .......................................................... 348/43
See application file for complete search history.

(56) References Cited

U.S. PATENT DOCUMENTS 7,738,499 B2 *  6/2010  Kugumiya et al. ........... 370/503
8,467,332 B2 *  6/2013  Yamaura ....................... 370/321

(Continued)

FOREIGN PATENT DOCUMENTS

| JP | 6-338854 | 12/1994 |
|---|---|---|
| JP | 8-317423 | 11/1996 |
| JP | 2006-109000 | 4/2006 |

OTHER PUBLICATIONS

International Preliminary Report on Patentability issued Mar. 14, 2013 in International (PCT) Application No. PCT/JP2011/004235.

(Continued)

*Primary Examiner* — Sath V Perungavoor
*Assistant Examiner* — James Pontius
(74) *Attorney, Agent, or Firm* — Wenderoth, Lind & Ponack, L.L.P.

(57) ABSTRACT

A timing signal generating part generates a timing signal at a preceding timing preceding a switchover timing between a video signal for the left eye and a video signal for the right eye by a predetermined offset time. When a transmitting time adjustment cause is detected by an adjustment cause detecting part at a generating timing of the timing signal, a timing signal transmitting part generates an adjusted timing signal by adjusting the transmitting time of the timing signal by a predetermined adjustment time at a transmitting time at which the transmitting time adjustment cause does not exist, adds adjustment time information including the information on the adjustment time to the adjusted timing signal, and wirelessly transmits the resultant signal to the wireless communication apparatus.

21 Claims, 24 Drawing Sheets

(56) References Cited

U.S. PATENT DOCUMENTS

| | | |
|---|---|---|
| 8,473,638 B2 * | 6/2013 | Aweya et al. ............... 709/248 |
| 2001/0043266 A1 | 11/2001 | Robinson et al. |
| 2004/0081053 A1 * | 4/2004 | Kojima .................. 369/59.11 |
| 2006/0072627 A1 | 4/2006 | Kugumiya et al. |
| 2009/0135856 A1 | 5/2009 | Gha et al. |
| 2010/0098051 A1 * | 4/2010 | Uemura ..................... 370/350 |

OTHER PUBLICATIONS

International Search Report issued Oct. 18, 2011 in International (PCT) Application No. PCT/JP2011/004235.

* cited by examiner

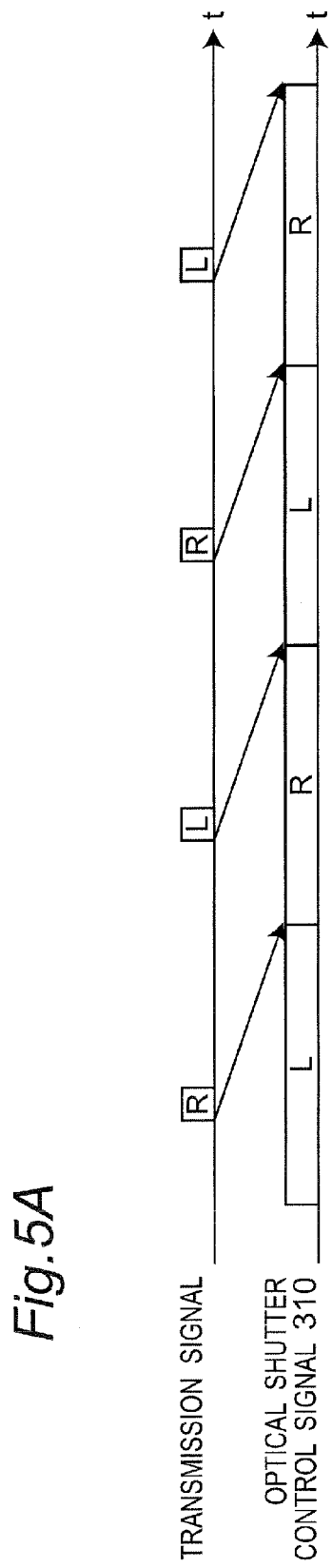

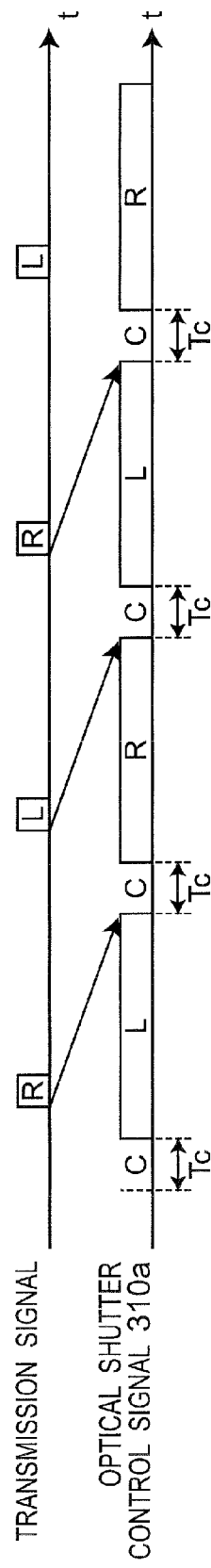

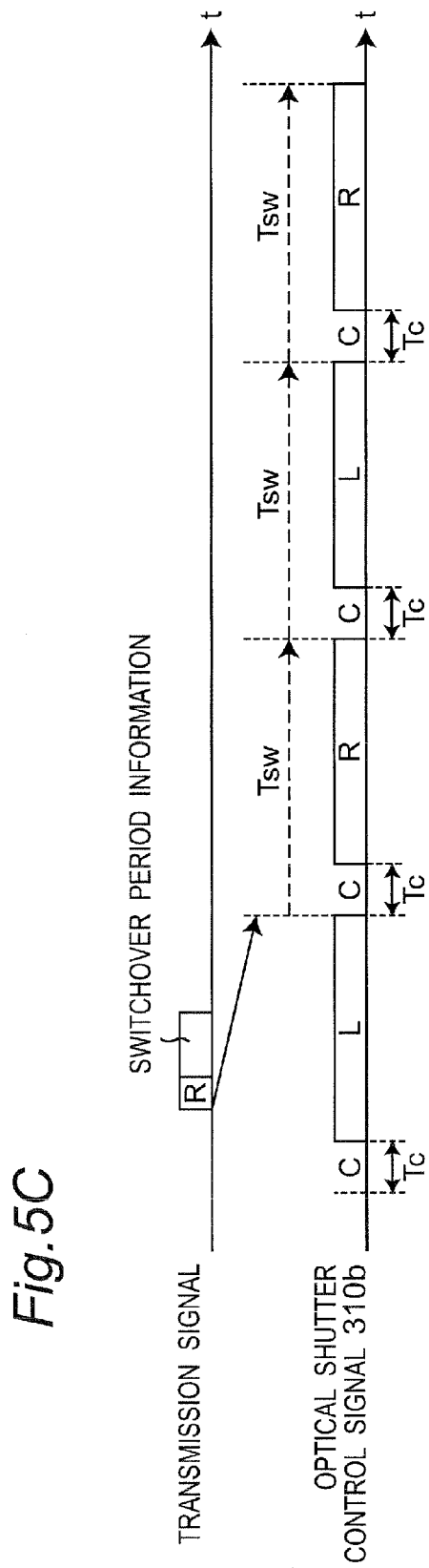

WIRELESS COMMUNICATION APPARATUS FOR TRANSMITTING INFORMATION ON CONTROL TIMING AND DETECTING CAUSE OF TRANSMISSION TIMING ADJUSTMENT

This is a continuation application of International application No. PCT/JP2011/004235 as filed on Jul. 27, 2011, which claims priority to Japanese patent application No. JP 2010-169995 as filed on Jul. 29, 2010, the contents of which are incorporated herein by reference.

BACKGROUND OF THE INVENTION

1. Field of the Invention

The present invention relates to a wireless communication apparatus that wirelessly transmits information on a predetermined control timing, a wireless communication apparatus that wirelessly receives the information, a wireless communication system that wirelessly transmits and receives the information, and a wireless communication method for the wireless communication system.

2. Description of the Related Art

BACKGROUND ART

As one application of wireless communications, signals such as various control signals or a time signal may be transmitted to a remote location at an accurate timing. A stereoscopic vision system has been popularized in recent years, and is a typical example of such an application. The stereoscopic vision system displays an image for the left eye and an image for the right eye alternately on an image display part for displaying the images. In addition, the stereoscopic vision system controls an optical shutter of shutter glasses, which are worn on the eye portion of a viewing audience, so as to show the image for the left eye to the left eye of the viewing audience and to show the image for the right eye to the right eye of the viewing audience. This control allows the viewing audience to view the images stereoscopically. Therefore, in order to correctly operate the stereoscopic vision system, it is required to wirelessly transmit the information on the right-left switchover timing for switchover between the right eye and the left eye in the optical shutter, from the image display part to the optical shutter at the correct timing with certainty (See a Patent Document 1, for example).

According to a communication method described in the Patent Document 1, at least one of a frequency value and a period value of fields or frames of the image is coded to generate a coded signal, and the coded signal is transmitted at a predetermined timing synchronized with a vertical synchronizing signal of the image. This reduces the frequency of transmission of a signal for driving the optical shutter, and also reduces the possibility of the occurrence of malfunction due to a shield between the image display part and the optical shutter.

Prior art documents are listed below.

Patent Document 1: Japanese Patent Laid-open Publication No. 8-317423 A;
Patent Document 2: United States Patent Application Publication No. US 2001/0043266 A1;
Patent Document 3: United States Patent Application Publication No. US 2006/0072627 A1; and
Patent Document 4: United States Patent Application Publication No. US 2009/0135856 A1.

SUMMARY OF THE INVENTION

Infrared rays are often used for the wireless transmission of the control signal that represents the above-described right-left switchover timing. On the other hand, another wireless communication system, which includes a remote controller using the infrared rays and a controlled apparatus controlled by the remote controller, is often used near the stereoscopic vision system. Therefore, the transmission of the control signal is often obstructed by a remote control signal from the remote controller or the transmission of the remote control signal is conversely obstructed by the control signal from the image display part of the stereoscopic vision system. However, such mutual obstructions cannot be avoided even when the communication method of the above-described Patent Document 1 is used.

If it is desired to prevent mutual interference between a first wireless communication system such as the stereoscopic vision system and a second wireless communication system, it is considered to use a carrier sense technique of stopping transmission of a signal from the first wireless communication system upon detecting a signal from the second wireless communication system. However, in this case, the control signal of the right-left switchover signal or the like is delayed and not wirelessly transmitted accurately when the transmission of the signal from the first wireless communication system is stopped. Accordingly, there is such a problem that the shutter for the right eye and the shutter for the left eye cannot be opened and closed in the optical shutter at a timing synchronized with the image display part in the stereoscopic vision system, and this leads to malfunctioning. In addition, also when a time interval, during when the control signal can be transmitted, is limited due to wireless transmission of a signal other than the above-described control signal or due to restrictions on the apparatus design, the control signal cannot be wirelessly transmitted accurately.

It is an object of the present invention to provide a wireless communication apparatus capable of solving the above-described problem and capable of wirelessly transmitting the information on a predetermined control timing with accuracy higher than that of the prior art even when obstructing causes of wireless communication such as the interference with another wireless communication system exist, a wireless communication apparatus that wirelessly receives the information, a wireless communication system that wirelessly transmits and receives the information, and a wireless communication method for the wireless communication system.

According to the first aspect of the invention, there is provided a first wireless communication apparatus. The first wireless communication apparatus includes a timing signal generating part, a detecting part, and a timing signal transmitting part. The timing signal generating part is configured to receive a control signal representing a predetermined control timing and to generate a timing signal having a transmission timing prior to the predetermined control timing by a predetermined offset time. The detecting part is configured to detect whether a timing adjustment event for adjusting the transmission timing of the timing signal exists. The timing signal transmitting part is is configured to receive a detection result from the detecting part. When the detection result reflects that the timing adjustment event does not exist, the timing signal transmitting part is configured to transmit the timing signal to a second wireless communication apparatus. When the detection result reflects that the timing adjustment event exists, the timing signal transmitting part is configured to (i) generate an adjusted timing signal by adjusting the transmission timing of the timing signal by a predetermined adjustment time to a transmission timing when the timing adjustment event does not exist, and (ii) transmit the adjusted timing signal to the second wireless communication apparatus.

In the above-described first wireless communication apparatus, the control signal preferably represents a display period of a left-eye image and a display period of a right-eye image. The detection part preferably detects that the timing adjustment event exists when the detection part detects a wireless signal from a third wireless communication apparatus interfering with the timing signal. When the detection part detects the wireless signal, the timing signal transmitting part is configured to transmit the adjusted timing signal and information associated with the predetermined adjustment time to the second wireless communication apparatus, the information associated with the predetermined adjustment time representing that the transmission timing of the timing signal is delayed.

In addition, in the above-described first wireless communication apparatus, the first wireless communication apparatus preferably constitutes a three-dimensional television, and the second wireless communication apparatus preferably constitutes a three-dimensional glasses.

Further, in the above-described first wireless communication apparatus, the detection part preferably detects that the timing adjustment event exists when the detection part detects a wireless signal from a third wireless communication apparatus interfering with the timing signal.

Still further, in the above-described first wireless communication apparatus, the detecting part preferably includes a wireless receiving part and a signal detecting part. The wireless receiving part is preferably configured to receive a wireless signal from a third wireless communication apparatus and output a signal representing an intensity of the wireless signal to the signal detecting part. The signal detecting part is preferably configured to detect whether the timing adjustment event exists based on the signal outputted by the wireless receiving part.

In addition, in the above-described first wireless communication apparatus, the detection part preferably detects that the timing adjustment event exists when the detection part detects an audio signal to be transmitted by the first wireless communication apparatus.

Further, in the above-described first wireless communication apparatus, the timing signal transmitting part is preferably configured to wirelessly transmit the audio signal with the adjusted timing signal.

Still further, in the above-described first wireless communication apparatus, the detection part preferably detects that the timing adjustment event exists when the detection part detects a transmission starting time for transmitting the generated timing signal is limited within a predetermined time interval due to a restriction on a design of the first wireless communication apparatus.

In addition, in the above-described first wireless communication apparatus, the control signal preferably has a predetermined control period, and the timing signal generating part is preferably configured to generate a timing signal having a period the same as the control period.

Further, in the above-described first wireless communication apparatus, the control signal preferably has a predetermined control period, and the timing signal generating part is preferably configured to generate a timing signal that has a period longer than the control period.

Still further, in the above-described first wireless communication apparatus, the predetermined offset time is preferably set to a time longer than the control period.

In addition, in the above-described first wireless communication apparatus, when the detecting part detects that the timing adjustment event exists at the transmission timing and the timing adjustment event exists from a generating timing of a timing signal previous to the timing signal to be processed until a predetermined first elapsed time elapses, the timing signal transmitting part preferably stops generating the adjusted timing signal corresponding to the timing signal to be processed.

Further, in the above-described first wireless communication apparatus, when the detecting part detects that the timing adjustment event exists at the transmission timing and when the timing signal transmitting part is wirelessly transmitting a second adjusted timing signal at the transmission timing, the timing signal transmitting part preferably generates the adjusted timing signal by adjusting the transmission timing of the timing signal by the adjustment time to a transmitting time when the timing adjustment event does not exist and the second adjusted timing signal is not being wirelessly transmitted.

Still further, in the above-described first wireless communication apparatus, when the timing adjustment event is not detected by the detecting part at the transmission timing, the timing signal transmitting part preferably adds an adjustment time information indicating that an adjustment time is zero to the timing signal, and wirelessly transmits a resultant signal.

In addition, in the above-described first wireless communication apparatus, the timing signal transmitting part preferably performs wireless transmission by using one of infrared rays, electromagnetic waves and ultrasonic waves.

Further, in the above-described first wireless communication apparatus, the timing signal transmitting part preferably transmits information associated with the predetermined adjustment time to the second wireless communication apparatus. The timing signal transmitting part preferably converts the information associated with the predetermined adjustment time and the adjusted timing signal into separate wireless packets, and wirelessly transmits the wireless packets to the second wireless communication apparatus.

Still further, the above-described first wireless communication apparatus preferably further includes an image display apparatus. The control signal preferably represents a display period of a video signal for a left-eye and a display period of a video signal for a right-eye for the image display apparatus connected to the first wireless communication apparatus. The control timing preferably represents switchover timing between the video signal for the left eye and the video signal for the right eye.

According to the second aspect of the invention, there is provided a wireless communication system including a first wireless communication apparatus and a second wireless communication apparatus, the first wireless communication apparatus wirelessly transmitting a signal and the second wireless communication apparatus wirelessly receiving the signal. The first wireless communication apparatus includes a timing signal generating part, a detecting part, and a timing signal transmitting part. The timing signal generating part is configured to receive a control signal representing a predetermined control timing and to generate a timing signal having a transmission timing prior to the predetermined control timing by a predetermined offset time. The detecting part is configured to detect whether a timing adjustment event for adjusting the transmission timing of the timing signal exists. The timing signal transmitting part is configured to receive a detection result from the detecting part and, when the detection result reflects that the timing adjustment event exists, to (i) generate an adjusted timing signal by adjusting the transmission timing of the timing signal by a predetermined adjustment time to a transmission timing when the timing adjustment event does not exist, and (ii) wirelessly transmit the adjusted timing signal and information associated with the predetermined adjustment time to the second wireless communication apparatus. The second wireless communication apparatus is configured to (i) wirelessly receive the adjusted timing signal and the information associated with the predetermined adjustment time, (ii) correct a shift time corresponding to the predetermined offset time by the predetermined adjustment time included in the information, and (iii) generate a corrected timing signal representing the predetermined control timing by shifting the wirelessly received adjusted timing signal by the shift time.

In the above-described wireless communication system, when the second wireless communication apparatus does not receive a next adjusted timing signal before a predetermined second elapsed time elapses after generating the corrected timing signal, the second wireless communication apparatus preferably generates a next corrected timing signal based on a period of corrected timing signals that have been generated.

In addition, the above-described wireless communication system preferably further includes an image display apparatus and an optical shutter. The control signal preferably represents a display period of a video signal for a left-eye and a display period of a video signal for a right-eye for the image display apparatus connected to the first wireless communication apparatus. The control timing preferably represents switchover timing between the video signal for the left-eye and the video signal for the right-eye. The second wireless communication apparatus preferably outputs the corrected timing signal to the optical shutter that is connected to the second wireless communication apparatus and has a shutter for the left-eye and a shutter for the right-eye. The optical shutter preferably controls opening and closing of the shutter for the left-eye and the shutter for the right-eye based on the corrected timing signal.

According to the third aspect of the invention, there is provided a wireless communication method including steps of:

receiving, at a first wireless communication apparatus, a control signal representing a predetermined control timing;

generating, at the first wireless communication apparatus, a timing signal having a transmission timing prior to the predetermined control timing by a predetermined offset time;

determining, at the first wireless communication apparatus, whether a timing adjustment event for adjusting the transmission timing of the timing signal exists;

upon determining that the timing adjustment event exists, generating an adjusted timing signal by adjusting the transmission timing of the timing signal by a predetermined adjustment time to a transmission timing when the timing adjustment event does not exist;

transmitting the adjusted timing signal along with information associated with the predetermined adjustment time from the first wireless communication apparatus to the second wireless communication apparatus;

receiving, at the second wireless communication apparatus, the adjusted timing signal and the information associated with the predetermined adjustment time;

correcting, at the second wireless communication apparatus, a shift time corresponding to the predetermined offset time by the predetermined adjustment time included in the information; and generating, at the second wireless communication apparatus, a corrected timing signal representing the predetermined control timing by shifting the adjusted timing signal by the shift time.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 5A is a timing chart showing a transmission signal generated by an adjustment time information adding part 14 of FIG. 1 and an optical shutter control signal 310 generated by an optical shutter 4;

FIG. 5B is a timing chart showing the transmission signal and an optical shutter control signal 310a according to a first modified preferred embodiment of the first preferred embodiment;

FIG. 5C is a timing chart showing the transmission signal and an optical shutter control signal 310b according to a second modified preferred embodiment of the first preferred embodiment;

DETAILED DESCRIPTION OF THE PREFERRED EMBODIMENTS

Figure 1:
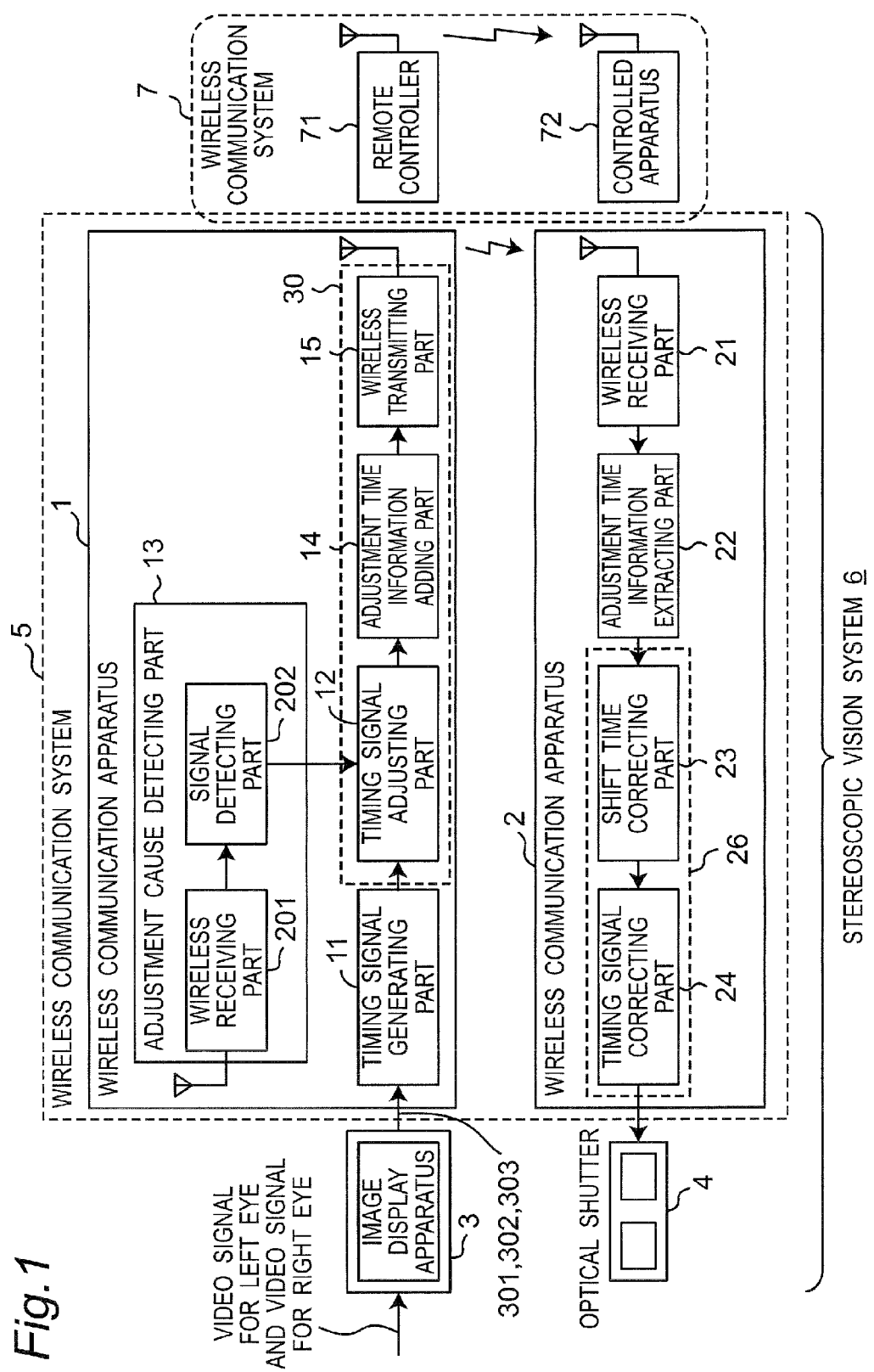
FIG. 1 is a block diagram showing a configuration of a stereoscopic vision system 6 according to a first preferred embodiment of the present invention.

Preferred embodiments of the present invention will be described hereinafter with reference to the drawings. In the preferred embodiments, components similar to each other are denoted by the same reference numerals.

First Preferred Embodiment

Figure 2:
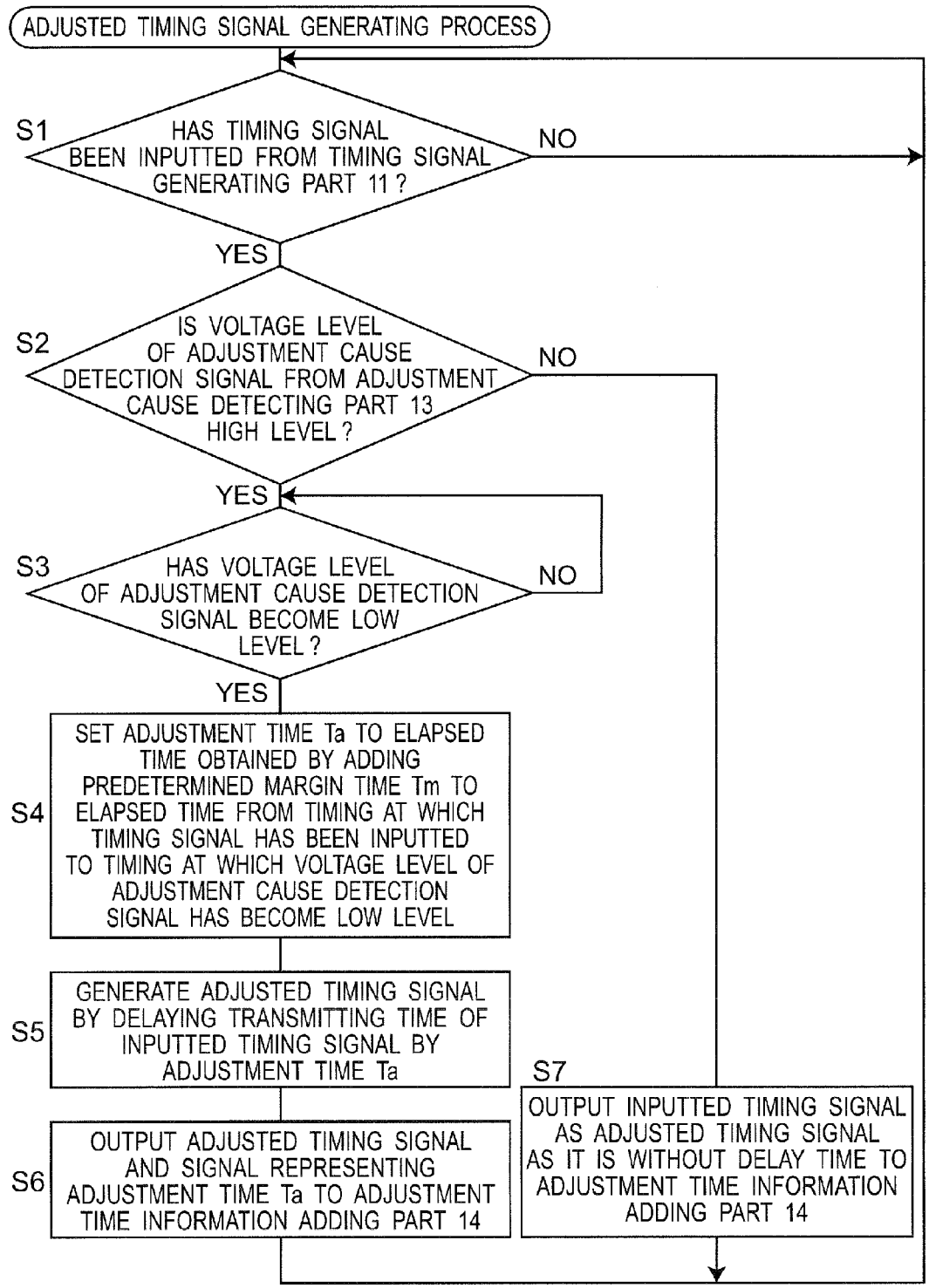
FIG. 2 is a flow chart showing an adjusted timing signal generating process executed by a timing signal adjusting part 12 of FIG. 1.
Figure 3:
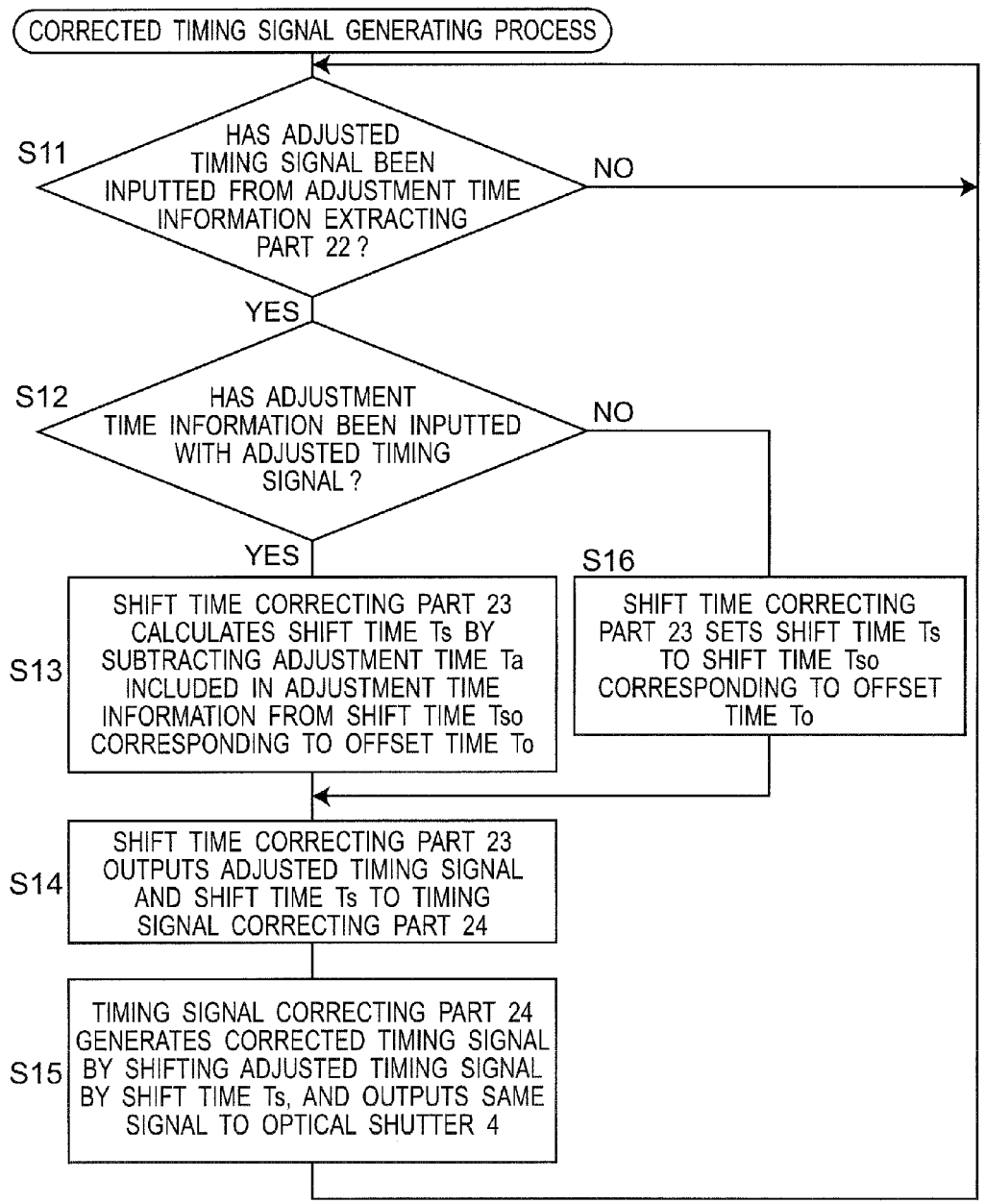
FIG. 3 is a flow chart showing a corrected timing signal generating process executed by a corrected timing signal generating part 26 of FIG. 1.

FIG. 1 is a block diagram showing a configuration of a stereoscopic vision system 6 according to the first preferred embodiment of the invention. FIG. 2 is a flow chart showing an adjusted timing signal generating process executed by a timing signal adjusting part 12 of FIG. 1, and FIG. 3 is a flow chart showing a corrected timing signal generating process executed by a corrected timing signal generating part 26 of FIG. 1. Further, FIG. 4 is a timing chart showing operations of the stereoscopic vision system 6 of FIG. 1.

Referring to FIG. 1, the stereoscopic vision system 6 is configured to include an image display apparatus 3, a wireless communication system 5, and an optical shutter 4. In addition, the wireless communication system 5 is configured to include wireless communication apparatuses 1 and 2. Further, the wireless communication apparatus 1 is configured to include a timing signal generating part 11, a timing signal transmitting part 30, and an adjustment cause detecting part 13 including a wireless receiving part 201 and a signal detecting part 202. In this case, the timing signal transmitting part 30 is configured to include the timing signal adjusting part 12, an adjustment time information adding part 14, and a wireless transmitting part 15. Still further, the wireless communication apparatus 2 is configured to include a wireless receiving part 21, an adjustment time information extracting part 22, and the corrected timing signal generating part 26 including a shift time correcting part 23 and a timing signal correcting part 24.

Referring to FIG. 1, the image display apparatus 3, such as a television broadcasting receiver, a monitor apparatus or a projector apparatus, has a stereoscopic vision display function of receiving a video signal for the left eye and a video signal for the right eye from an external apparatus such as an image reproducing apparatus, and displaying the same signals alternately. Further, as shown in FIG. 4, based on the video signal for the left eye and the video signal for the right eye, the image display apparatus 3 generates a right-left signal (right-left switchover signal) 301, and a vertical synchronizing signal 302 and a horizontal synchronizing signal 303 of the images, and outputs the same signals to the timing signal generating part 11. In this case, the right-left signal is a control signal representing the display period of the video signal for the left eye and the display period of the video signal for the right eye in the image display apparatus 3.

Figure 4:
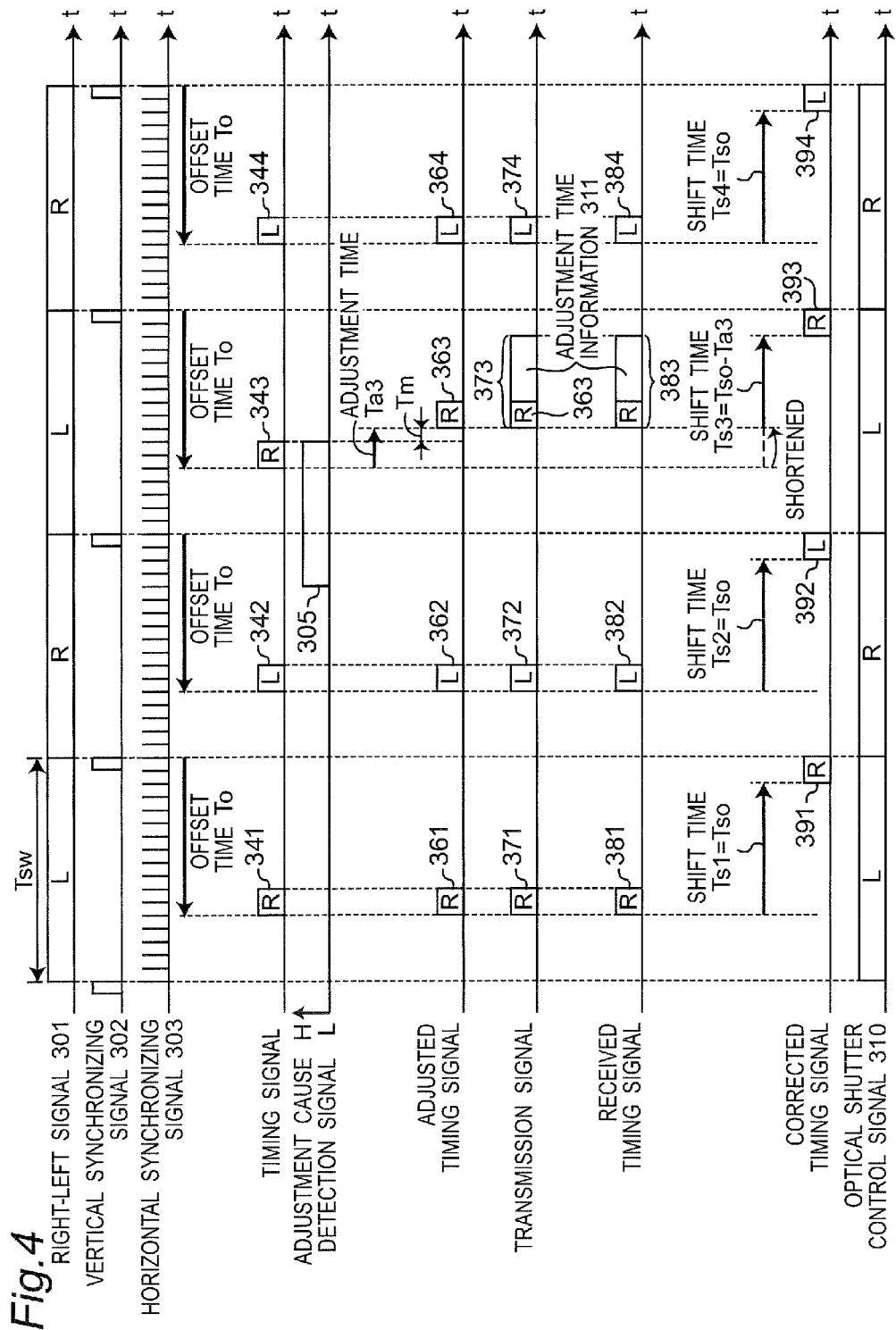
FIG. 4 is a timing chart showing operations of the stereoscopic vision system 6 of FIG. 1.

As shown in FIG. 4, the right-left signal 301 includes a control timing, which is the switchover timing between the video signal for the left eye and the video signal for the right eye. In addition, the right-left signal 301 has a predetermined switchover period (control period) Tsw of the video signal for the left eye and the video signal for the right eye. In addition, as shown in FIG. 4, switchover between the display period of the video signal for the left eye and the display period of the video signal for the right eye is performed at the fall timing of the vertical synchronizing signal 302. The wireless communication apparatus 1 generates a transmission signal that represents the switchover timing between the video signal for the left eye and the video signal for the right eye, by executing a predetermined process described in detail later for the inputted right-left signal 301, converts the transmission signal into a wireless signal, and wirelessly transmits the wireless signal to the wireless communication apparatus 2.

With regard to the right-left signal 301 shown in each of the timing charts of FIG. 4 and subsequent figures, it is noted that a letter of "L" represents the display period of the video signal for the left eye, and a letter of "R" represents the display period of the video signal for the right eye. In addition, with regard each of timing signals, adjusted timing signals, transmission signals, received timing signals and corrected timing signals shown in FIG. 4 and subsequent figures, the signals denoted by the letter of "R" correspond to the start timing of the display period of the video signal for the right eye, and the signals denoted by the letter of "L" correspond to the start timing of the display period of the video signal for the left eye. Further, with regard to a optical shutter control signal 310, the letter of "L" represents a period during which the shutter for the left eye of the optical shutter 4 is opened and the shutter for the right eye is closed, and the letter of "R" represents a period during which the shutter for the right eye of the optical shutter 4 is opened and the shutter for the left eye is closed.

Referring to FIG. 1, the wireless communication apparatus 2 generates a corrected timing signal (See FIG. 4) that represents the switchover timing between the video signal for the left eye and the video signal for the right eye by executing a predetermined process described in detail later for the wireless signal wirelessly received from the wireless communication apparatus 1, and outputs the corrected timing signal to the optical shutter 4. In this case, the wireless communication apparatus 2 and the optical shutter 4 constitute a 3D glasses apparatus for allowing the viewing audience to view the images displayed on the image display apparatus 3 stereoscopically, and the wireless communication apparatus 2 operates as a 3D glasses control signal receiver. The optical shutter 4 generates the optical shutter control signal 310 (See FIG. 4) that represents the period during which the shutter for the left eye is opened and the period during which the shutter for the right eye is opened based on the inputted corrected timing signal. Further, the optical shutter 4 controls the opening and closing of the shutter for the left eye and the shutter for the right eye, so as to show the image for the left eye to the left eye of the viewing audience and to show the image for the right eye to the right eye of the viewing audience according to the optical shutter control signal 310. By using the 3D glasses apparatus provided with the optical shutter 4, the viewing audience can view the images displayed on the image display apparatus 3 stereoscopically.

It is noted in FIG. 1 that the wireless transmission from the wireless communication apparatus 1 to the wireless communication apparatus 2 is performed by using infrared rays, electromagnetic waves or ultrasonic waves. In addition, as shown in FIG. 1, another wireless communication system 7 exists besides the wireless communication system 5. The wireless communication system 7 is configured to include a remote controller 71 that is a wireless communication apparatus and a controlled apparatus 72 controlled by the remote controller 71. Referring to FIG. 1, the wireless communication systems 5 and 7 interfere with each other, and there is such a possibility that the wireless communication systems 5 or 7 may receive a signal from another wireless communication systems 7 or 5. This possibility is shown by the intersecting dashed lines that show the wireless communication systems 5 and 7, respectively. For example, when the stereoscopic vision system 6 including the image display apparatus 3 such as a television broadcasting receiver and the controlled apparatus 72 such as an air conditioner are installed in one living room, the wireless communication systems 5 and 7 interfere with each other.

Next, operations of the parts 11 to 15, 21 to 24, 26, and 30 of the wireless communication apparatuses 1 and 2 are described. Referring to FIG. 1, based on the inputted right-left signal 301, the vertical synchronizing signal 302 and the horizontal synchronizing signal 303, the timing signal generating part 11 generates a timing signal that represents the switchover timing from the video signal for the left eye to the video signal for the right eye at a preceding timing preceding the start timing of the video signal for the right eye by a predetermined offset time To, and a timing signal that represents the switchover timing from the video signal for the right eye to the video signal for the left eye at a preceding timing preceding the start timing of the video signal for the left eye by the predetermined offset time To.

Concretely speaking, as shown in FIG. 4, the timing signal generating part 11 generates timing signals 341, 342, 343, 344, . . . , each of which represents the start timing of the video signal for the left eye or the start timing of the video signal for the right eye to be displayed next and has a predetermined duration, at a timing at which a predetermined number of horizontal synchronizing signals 303 is received from the fall time of the vertical synchronizing signal 302. It is noted that a time interval obtained by subtracting the offset time To from the vertical synchronization period corresponds to an elapsed time from the fall time of the vertical synchronizing signal 302. The timing signal generating part 11 outputs the timing signals 341, 342, 343, 344, . . . to the timing signal adjusting part 12. In this case, as shown in FIG. 4, the predetermined number of horizontal synchronizing signals 303 is set to, for example, five, and the duration of each timing signal is set double the horizontal synchronization period. Therefore, according to the present preferred embodiment, at the timing that precedes the switchover timing from the video signal for the left eye to the video signal for the right eye by the offset time To, the timing signals 341 and 343 corresponding to the switchover timing are generated. At the timing that precedes the switchover timing from the video signal for the right eye to the video signal for the left eye by the offset time To, the timing signals 342 and 344 corresponding to the switchover timing are generated. It is noted that the period of the timing signal is the same as the switchover period Tsw of the right-left signal 301.

Referring to FIG. 1, the wireless receiving part 201 receives the wireless signal transmitted from the remote controller 71 of the wireless communication system 7 other than the wireless communication system 5 toward the controlled apparatus 72, and outputs a signal that represents the received signal intensity of the received wireless signal to the signal detecting part 202. Then, the signal detecting part 202 detects whether or not the wireless communication apparatus 1 is receiving the wireless signal from the remote controller 71 based on the signal from the wireless receiving part 201, generates an adjustment cause detection signal that represents the detection result, and outputs the same signal to the timing signal adjusting part 12. Concretely speaking, as shown in FIG. 4, the signal detecting part 202 generates an adjustment cause detection signal 305 having a high level and representing that the wireless signal from the remote controller 71 is received, when the received signal intensity by the wireless receiving part 201 is equal to or larger than a predetermined threshold value. On the other hand, the signal detecting part 202 generates an adjustment cause detection signal having a low level and representing that the wireless signal from the remote controller 71 is not received, when the received signal intensity by the wireless receiving part 201 is smaller than the predetermined threshold value.

Referring to FIG. 4, the period, during which the adjustment cause detection signal 305 having the high level is outputted, corresponds to a period during which an adjustment cause (referred to as a transmitting time adjustment cause, or a communication adjustment cause, hereinafter) of the transmitting time of the timing signal from the wireless communication apparatus 1 to the wireless communication apparatus 2 exists. It is noted that the transmitting time adjustment cause is a timing adjustment event for adjusting the transmission timing of the timing signal. In addition, the period, during which the adjustment cause detection signal having the low level is outputted, corresponds to a period during which the transmitting time adjustment cause does not exist. In particular, in the case of the present preferred embodiment, the transmitting time adjustment cause is that the wireless receiving part 201 receives the wireless signal from the remote controller 71. In addition, the period during which the adjustment cause detection signal 305 having the high level is outputted is the period during which the wireless signal from the remote controller 71 is received by the wireless receiving part 201, and the period during which the adjustment cause detection signal having the low level is outputted is the period during which the wireless signal from the remote controller 71 is not received by the wireless receiving part 201. When the wireless communication apparatus 1 has a remote controller receiving part for controlling turning on/off of its own power supply or the like, the remote controller receiving part may be used as the wireless receiving part 201. In addition, an adjustment cause detection signal 305 (See FIG. 4) having the low level may be generated when the wireless signal from the remote controller 71 is received by the wireless receiving part 201, and an adjustment cause detection signal having the high level may be generated when the wireless signal from the remote controller 71 is not received by the wireless receiving part 201.

Referring to FIG. 1, the timing signal adjusting part 12 generates an adjusted timing signal based on the timing signal from the timing signal generating part 11 and the adjustment cause detection signal from the adjustment cause detecting part 13 by executing the adjusted timing signal generating process of FIG. 2, and outputs the adjusted timing signal to the adjustment time information adding part 14 with a signal that represents an adjustment time Ta described in detail later.

The adjusted timing signal generating process executed by the timing signal adjusting part 12 is described with reference to FIG. 2. At step S1 of FIG. 2, the timing signal adjusting part 12 judges whether or not the timing signal has been inputted from the timing signal generating part 11. If YES at step S1, then the control flow goes to step S2. On the other hand, if NO at step S1, then the process at step S1 is executed repetitively. At step S2, the timing signal adjusting part 12 judges whether or not the voltage level of the adjustment cause detection signal from the adjustment cause detecting part 13 is high level. If YES at step S2, then the control flow goes to step S3. On the other hand, if NO at step S3, the control flow goes to step S7. When the voltage level of the adjustment cause detection signal is the low level at the input time of the timing signal, the timing signal adjusting part 12 outputs the inputted timing signal as the adjusted timing signal to the adjustment time information adding part 14 as it is without any delay time at step S7, and the control flow returns to step S1.

In addition, at step S3 of FIG. 2, the timing signal adjusting part 12 judges whether or not the voltage level of the adjustment cause detection signal has become the low level. If YES at step S3, then the control flow goes to step S4. On the other hand, if NO at step S3, then the process at step S3 is executed repetitively. Then, at step S4, the timing signal adjusting part 12 sets the adjustment time Ta to an elapsed time obtained by adding a predetermined margin time Tm to an elapsed time from the timing at which the timing signal is inputted at step S1 to the timing at which the voltage level of the adjustment cause detection signal becomes low level at step S3. Subsequent to step S4, the timing signal adjusting part 12 generates at step S5 an adjusted timing signal by delaying the transmitting time of the timing signal inputted at step S1 by the adjustment time Ta. Then, at step S6, the adjusted timing signal and the signal that represents the adjustment time Ta are outputted to the adjustment time information adding part 14, and the control flow returns to step S1.

Namely, upon detecting that the timing signal has been inputted from the timing signal generating part 11 (when the answer is YES at step S1), the timing signal adjusting part 12 judges whether or not a transmitting time adjustment cause that overlaps with the transmitting time of the timing signal (i.e., the input time of the timing signal to the timing signal adjusting part 12) exists based on the adjustment cause detection signal (judgment process at step S2). When no transmitting time adjustment cause that overlaps with the transmitting time of the timing signal exists, the inputted timing signal is outputted as the adjusted timing signal without adjustment of the timing of the signal (at step S7). When a transmitting time adjustment cause that overlaps with the transmitting time of the timing signal exists, an adjusted timing signal that does not overlap temporally with the period, during which the transmitting time adjustment cause exists, is generated by delaying the transmitting time of the inputted timing signal by the adjustment time Ta (at step S5). Concretely speaking, in the period during which the voltage level of the adjustment cause detection signal 305 is the high level, the timing signal adjusting part 12 stops outputting the timing signal from the timing signal generating part 11 as the adjusted timing signal to the adjustment time information adding part 14 and stands by, and delays the output of the adjusted timing signal to the adjustment time information adding part 14 until the voltage level of the adjustment cause detection signal 305 becomes the low level.

Referring to FIG. 1, when only the adjusted timing signal is inputted from the timing signal adjusting part 12, the adjustment time information adding part 14 outputs the inputted adjusted timing signal as a transmission signal as it is to the wireless transmitting part 15. In addition, when the adjusted timing signal and the signal that represents the adjustment time Ta are inputted from the timing signal adjusting part 12, the adjustment time information adding part 14 adds the adjustment time information that represents the adjustment time Ta to the inputted adjusted timing signal, and outputs a resultant signal to the wireless transmitting part 15 as the transmission signal. It is noted that the format of the adjustment time information may be any format so long as the adjustment time information represents that the transmitting time of the timing signal is delayed and includes information on the delayed adjustment time Ta.

In addition, referring to FIG. 1, the wireless transmitting part 15 has transmitting means such as an infrared ray emitter, an antenna to radiate electromagnetic waves or an ultrasonic wave radiator, converts the transmission signal inputted from the adjustment time information adding part 14 into a wireless signal, and wirelessly transmits the wireless signal toward the wireless communication apparatus 2 by using the transmitting means.

As described above, when the transmitting time adjustment cause is not detected by the adjustment cause detecting part 13 at the input timing of the timing signal, the timing signal transmitting part 30 wirelessly transmits the timing signal as the adjusted timing signal to the wireless communication apparatus 2. In addition, when the transmitting time adjustment cause is detected by the adjustment cause detecting part 13 at the input timing of the timing signal, the timing signal transmitting part 30 generates the adjusted timing signal at the transmitting time at which no transmitting time adjustment cause exists, by delaying (adjusting) the transmitting time of the timing signal by the predetermined adjustment time Ta, adds the adjustment time information including the information on the adjustment time Ta to the adjusted timing signal, and wirelessly transmits the resultant signal to the wireless communication apparatus 2.

Further, referring to FIG. 1, the wireless receiving part 21 receives the wireless signal from the wireless transmitting part 15, performs a predetermined conversion process for the received wireless signal, converts a resultant signal into a received timing signal corresponding to the transmission signal generated by the adjustment time information adding part 14, and outputs the received timing signal to the adjustment time information extracting part 22. In addition, when the received timing signal from the wireless receiving part 21 includes no adjustment time information, the adjustment time information extracting part 22 outputs the received timing signal as it is to the shift time correcting part 23 as the adjusted timing signal. On the other hand, when the received timing signal includes the adjustment time information, the adjustment time information extracting part 22 separates and extracts the adjustment time information from the received timing signal, and outputs the separated adjusted timing signal and the adjustment time information to the shift time correcting part 23.

Still further, referring to FIG. 1, the timing signal generating part 26 generates a corrected timing signal based on the adjusted timing signal and the adjustment time information from the adjustment time information extracting part 22 by executing the corrected timing signal generating process of FIG. 3, and outputs the corrected timing signal to the optical shutter 4.

The corrected timing signal generating process executed by the corrected timing signal generating part 26 is described next with reference to FIG. 3. At step S11 of FIG. 3, the shift time correcting part 23 judges whether or not the adjusted timing signal has been inputted from the adjustment time information extracting part 22. If YES at step S11, then the control flow goes to step S12. On the other hand, if NO at step S11, the process at step S11 is executed repetitively. At step S12, the adjustment time information extracting part 22 judges whether or not the adjustment time information has been inputted with the adjusted timing signal. If YES at step S12, then the control flow goes to step S130 On the other hand, if NO at step S12, then the control flow goes to step S16. Then, at step S13, the shift time correcting part 23 calculates a shift time Ts by subtracting the adjustment time Ta included in the adjustment time information from the shift time Tso corresponding to the offset time To, and the control flow goes to step S14. On the other hand, at step S16, the shift time correcting part 23 sets the shift time Ts to a shift time Tso corresponding to the offset time To, and the control flow goes to step S14.

At step S14 of FIG. 3, the shift time correcting part 23 outputs the adjusted timing signal inputted from the adjustment time information extracting part and the shift time Ts to the timing signal correcting part 24, and the control flow goes to step S15. At step S15, the timing signal correcting part 24 generates a corrected timing signal by shifting the adjusted timing signal by the shift time Ts, and outputs the same signal to the optical shutter 4. Then, the control flow returns to step S11. In this case, as shown in FIG. 4, the fall timing of the corrected timing signal represents the switchover timing between the video signal for the left eye and the video signal for the right eye.

A concrete operation example of the stereoscopic vision system 6 of FIG. 1 is described next with reference to FIG. 4. Referring to FIG. 4, the timing signal generating part 11 generates the timing signals 341 to 344 that represent the switchover timing between the display period of the video signal for the right eye and the display period of the video signal for the left eye based on the right-left signal 301, the vertical synchronizing signal 302 and the horizontal synchronizing signal 303 from the image display apparatus 3, and outputs the timing signals 341 to 344 to the timing signal adjusting part 12. In this case, the rise timing of each of the timing signals 341 to 344 precedes the switchover timing subsequent to the same rise timing by the offset time To. By this operation, the timing signal that represents the switchover timing from one video signal of the video signal for the left eye and the video signal for the right eye to another video signal to be displayed subsequently can be outputted in the period during which the one video signal is displayed on the image display apparatus 3. Referring to FIG. 4, the timing signals 342 and 344 correspond to the switchover timings to the video signal for the left eye, and the timing signals 341 and 343 correspond to the switchover timings to the video signal for the right eye.

In addition, referring to FIG. 4, the voltage level of the adjustment cause detection signal is the low level at the rise timings of the timing signals 341, 342 and 344. Therefore, the timing signal adjusting part 12 outputs the timing signals 341, 342 and 344 as the adjusted timing signals 361, 362 and 364, respectively, to the adjustment time information adding part 14 without the adjustment time Ta (which is a delay time in the present preferred embodiment).

On the other hand, the adjustment cause detection signal 305 having the high level is generated at the rise timing of the timing signal 343. Therefore, the timing signal adjusting part 12 stops outputting the timing signal 343 until the output of the adjustment cause detection signal 305 having the high level ends, generates an adjusted timing signal 363 by delaying the timing signal 343 by an adjustment time Ta3, and outputs the adjusted timing signal 363 to the adjustment time information adding part 14 with a signal that represents the information on the adjustment time Ta3.

Further, referring to FIG. 4, the adjustment time information adding part 14 outputs the adjusted timing signals 361, 362 and 364 as transmission signals 371, 372 and 374, respectively, to the wireless transmitting part 15. In addition, the adjustment time information adding part 14 adds adjustment time information 311 that is the information on the adjustment time Ta3 to the adjusted timing signal 363, and outputs a resultant signal to the wireless transmitting part 15 as a transmission signal 373. The wireless transmitting part 15 converts the transmission signals 371 to 374 into a wireless signal, and transmits the wireless signal to the wireless communication apparatus 2.

Referring to FIG. 4, the wireless receiving part 21 receives the wireless signal from the wireless communication apparatus 1, executes a predetermined conversion process for the received wireless signal, and extracts received timing signals 381 to 384. Then, the adjustment time information extracting part 22 judges whether or not each of the received timing signals 381 to 384 includes the adjustment time information (whether or not the adjustment time information is added to each of the received timing signals 381 to 384). Then, the adjustment time information 311 is extracted from the received timing signal 383 that includes the adjustment time information 311, and the adjustment time information 311 and the adjusted timing signal obtained after extracting the adjustment time information 311 are outputted to the shift time correcting part 23. In addition, the adjustment time information extracting part 22 outputs the received timing signals 381, 382 and 384 to which no adjustment time information is added as they are to the shift time correcting part 23.

In addition, referring to FIG. 4, since each of the received timing signals 381, 382 and 384 includes no adjustment time information, the shift time correcting part 23 sets shift times Ts1, Ts2 and Ts4 corresponding to the adjusted timing signals included in the received timing signals 381, 382 and 384, respectively, to the predetermined shift time Tso. In addition, since the adjustment time information 311 is extracted from the received timing signal 383 by the adjustment time information extracting part 22, the shift time correcting part 23 calculates time obtained by shortening the predetermined shift time Tso by the adjustment time Ta3 included in the adjustment time information 311 as a shift time Ts3 corresponding to the adjusted timing signal included in the received timing signal 383, and outputs the shift time Ts3 to the timing signal correcting part 24.

Further, referring to FIG. 4, the timing signal correcting part 24 shifts the adjusted timing signals included in the received timing signals 381, 382, 383 and 384 by shift times Ts1, Ts2, Ts3 and Ts4, respectively, and outputs resultant signals as corrected timing signals 391, 392, 393 and 394 to the optical shutter 4. As shown in FIG. 4, each of the adjusted timing signals included in the received timing signals 381, 382 and 384 is corrected by the predetermined shift time Tso, and the adjusted timing signal included in the received timing signal 383 is corrected by the shift time Ts3 corrected to shorten the predetermined shift time Tso by the adjustment time Ta3.

Still further, referring to FIG. 4, the optical shutter 4 generates an optical shutter control signal 310 based on the inputted corrected timing signal, and controls the opening and closing of the shutter for the left eye and the shutter for the right eye. By this operation, the optical shutter 4 performs switchover between the shutter for the left eye and the shutter for the right eye according to timing the same as the switchover timing of the right-left signal 301.

The offset time To and the shift time Tso described above are set as follows. It is preferred to set the offset time To to a duration of equal to or longer than an estimated duration of the period during which the wireless signal is transmitted from the other wireless communication system 7 (the period during which the transmitting time adjustment cause exists). With this setting, even when the timing signal adjusting part 12 generates the adjusted timing signal by delaying the timing signal by the adjustment time Ta due to the existence of the transmitting time adjustment cause, the shift time Ts can be corrected by the adjustment time Ta by the corrected timing signal generating part 26. In addition, it is preferred to set the shift time Tso so that the switchover timing between the video signal for the left eye and the video signal for the right eye in the image display apparatus 3 coincides with the switchover timing between the shutter for the left eye and the shutter for the right eye in the optical shutter 4, by subtracting at least a processing time required for various processes such as the wireless transmission and reception and the response time of the optical shutter 4, from the offset time To.

As described above, according to the present preferred embodiment, in the wireless communication apparatus 1, the timing signal generating part 11 generates the timing signal at the preceding timing preceding the switchover timing between the display period of the video signal for the left eye and the display period of the video signal for the right eye, by the offset time To. When no transmitting time adjustment cause exists at the time of generating the timing signal, the timing signal is wirelessly transmitted as the adjusted timing signal as it is to the wireless communication apparatus 2. On the other hand, when the transmitting time adjustment cause exists, the adjusted timing signal is generated by delaying the timing signal by the predetermined delay time to a timing at which the transmitting time adjustment cause does not exist, and wirelessly transmitted to the wireless communication apparatus 2 with the adjustment time information including the delay time. On the other hand, the wireless communication apparatus 2 calculates the shift time Ts based on the shift time Tso corresponding to the offset time To and the adjustment time information, and generates the corrected timing signal by shifting the received adjusted timing signal by the shift time Ts. Therefore, even if the transmitting time adjustment cause that the wireless communication apparatus 1 is receiving the wireless signal from the remote controller 71 exists, the adjusted timing signal can be transmitted wirelessly during the period in which the transmitting time adjustment cause does not exist, and the switchover timing between the display period of the video signal for the left eye and the display period of the video signal for the right eye can be reproduced in the wireless communication apparatus 2 with accuracy higher than that of the prior art.

In addition, according to the present preferred embodiment, the wireless communication apparatus stops the wireless transmission of the adjusted timing signal while receiving the wireless signal from the remote controller 71, and therefore, no influence is exerted on the transmission of the wireless signal from the remote controller 71 to the controlled apparatus 72.

First Modified Preferred Embodiment of First Preferred Embodiment

FIG. 5A is a timing chart showing the transmission signal generated by the adjustment time information adding part 14 of FIG. 1 and the optical shutter control signal 310 generated by the optical shutter 4. As shown in FIG. 5A, in the first preferred embodiment, the opening and closing of the shutter for the left eye and the shutter for the right eye are controlled correspondingly with the transmission signal that represents the switchover timing between the display period of the video signal for the left eye and the display period of the video signal for the right eye, however, the present invention is not limited to this.

FIG. 5B is a timing chart showing the transmission signal and an optical shutter control signal 310a according to the first modified preferred embodiment of the first preferred embodiment. In the present modified preferred embodiment, the optical shutter control signal 310a represents a period L during which the shutter for the left eye is opened, a period R during which the shutter for the right eye is opened, and a period C during which both of the shutters are closed. The period C has a predetermined duration Tc, and is provided at the head of the period L and the head of the period R. With this arrangement, it is possible to reduce the possibility of the occurrence of a right-left crosstalk (which refers to simultaneous opening of both of the shutter for the left eye and the shutter for the right eye).

Second Modified Preferred Embodiment of First Preferred Embodiment

FIG. 5C is a timing chart showing the transmission signal and an optical shutter control signal 310b according to the second modified preferred embodiment of the first preferred embodiment. Referring to FIG. 5C, the transmission signal represents the start timing of the period C during which both of the shutters are closed immediately before the display period of the video signal for the right eye, and information on a switchover period Tsw that is the duration of a period including the period C and the period L or the period R (having a duration the same as that of the period L). As described above, it is required to wirelessly transmit the information on the accurate switchover timing at any time point to the wireless communication apparatus 2, even when the transmission signal includes the information on the switchover period Tsw. Therefore, in a manner similar to that of the first preferred embodiment, it is important to reproduce the switchover timing accurately by correcting the shift time Ts by the adjustment time Ta in the wireless communication apparatus 2.

Second Preferred Embodiment

In the stereoscopic vision system 6 of the first preferred embodiment, the transmitting time adjustment cause was that the wireless communication apparatus 1 receives the wireless signal from the remote controller 71. In contrast to this, in the present preferred embodiment, there will be explained a configuration and operations of a stereoscopic vision system 706 in such a case where the transmitting time adjustment cause is that a wireless communication apparatus 701 wirelessly transmits a non-timing signal other than the adjusted timing signal. It is noted in the present preferred embodiment that components executing operations similar to those of the first preferred embodiment are denoted by the same reference numerals, and no description is provided for them.

Figure 6:
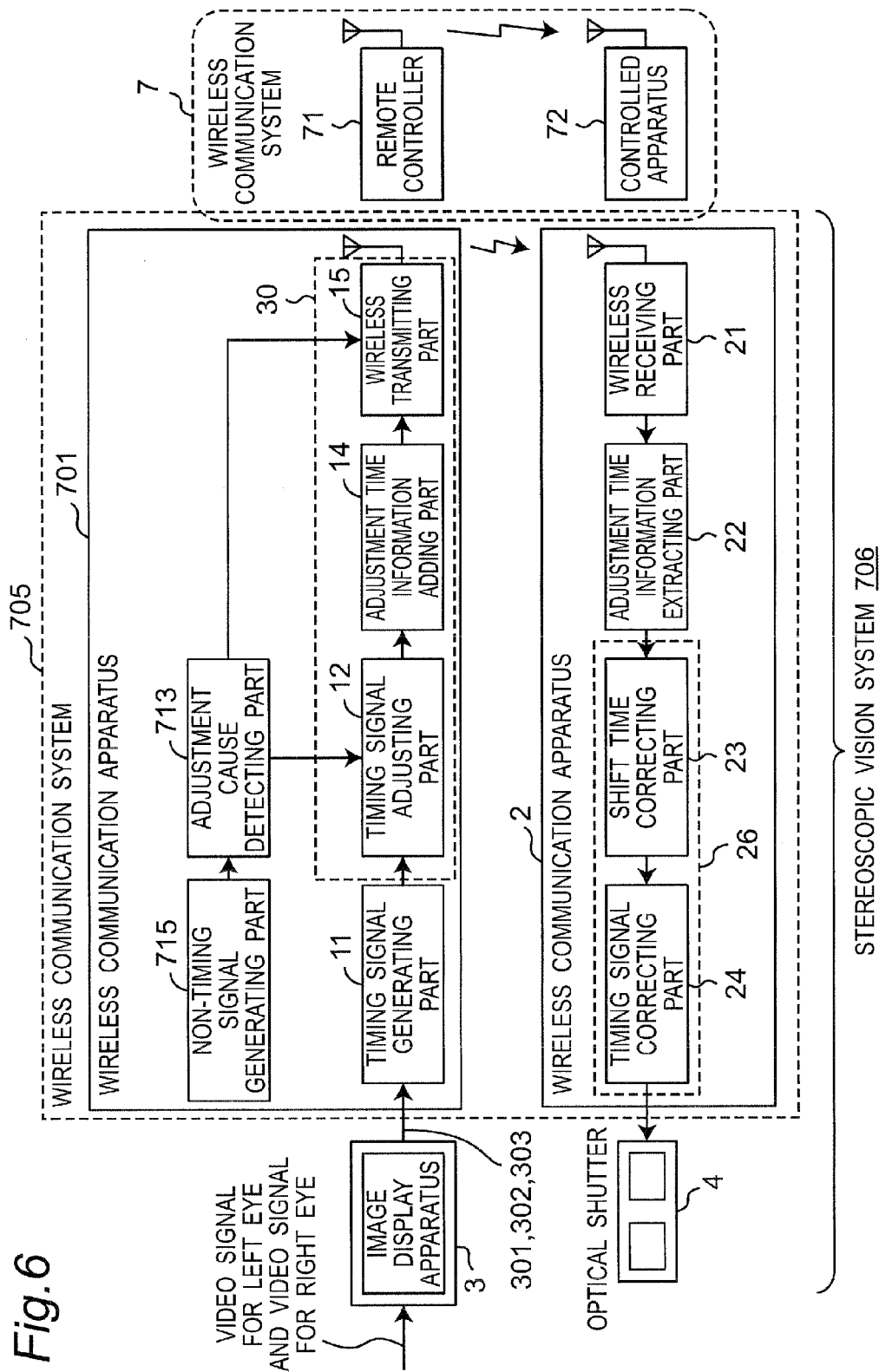
FIG. 6 is a block diagram showing a configuration of a stereoscopic vision system 706 according to a second preferred embodiment of the present invention.

FIG. 6 is a block diagram showing a configuration of the stereoscopic vision system 706 according to the second preferred embodiment of the present invention. The stereoscopic vision system 706 of the present preferred embodiment is configured to include a wireless communication system 705 in place of the wireless communication system 5 as compared with the stereoscopic vision system 6 of the first preferred embodiment of FIG. 1. In addition, the wireless communication system 705 is configured to include the wireless communication apparatus 701 in place of the wireless communication apparatus 1 as compared with the wireless communication system 5. Further, the wireless communication apparatus 701 includes a non-timing signal generating part 715 and an adjustment cause detecting part 713 in place of the adjustment cause detecting part 13 as compared with the wireless communication apparatus 1.

Referring to FIG. 6, an audio signal synchronized with the image displayed on the image display apparatus 3 is outputted from the loudspeaker (not shown) of a 3D glasses apparatus that is one example of the wireless communication apparatus 2. Referring to FIG. 6, the non-timing signal generating part 715 generates a non-timing signal, and outputs the same signal to the adjustment cause detecting part 713. In this case, the non-timing signal is a packetized audio signal to be wirelessly transmitted to the wireless communication apparatus 2. The adjustment cause detecting part 713 detects whether or not the non-timing signal generating part 715 is outputting the non-timing signal. When the non-timing signal generating part 715 is outputting the non-timing signal, the adjustment cause detecting part 713 outputs an adjustment cause detection signal having the high level to the timing signal adjusting part 12, and outputs the non-timing signal to the wireless transmitting part 15. When the non-timing signal generating part 715 is not outputting the non-timing signal, the adjustment cause detecting part 713 outputs the adjustment cause detection signal having the low level to the timing signal adjusting part 12. The wireless transmitting part 15 converts the inputted non-timing signal into a wireless signal substantially without delay, and wirelessly transmits the wireless signal to the wireless communication apparatus 2. The wireless communication apparatus 2 generates an audio signal by executing a predetermined process for the non-timing signal that has been wirelessly received by the wireless receiving part 21, and outputs the audio signal to the loudspeaker.

Therefore, according to the present preferred embodiment, the adjustment cause detecting part 713 detects whether or not the transmitting time adjustment cause that the wireless communication apparatus 701 wirelessly is transmitting the non-timing signal other than the adjusted timing signal exists, and outputs the adjustment cause detection signal representing the detection result to the timing signal adjusting part 12. Therefore, the adjusted timing signal can be generated and wirelessly transmitted to the wireless communication apparatus 2 in the period during which the non-timing signal is not wirelessly transmitted.

In the present preferred embodiment, it is preferred to set the offset time To (See FIG. 4) to a time equal to or longer than the estimated duration of the period during which the non-timing signal is wirelessly transmitted. In addition, the non-timing signal is the audio signal in the present preferred embodiment, however, the present invention is not limited to this. The non-timing signal may be any signal other than the adjusted timing signal that is wirelessly transmitted to the wireless communication apparatus 2.

Third Preferred Embodiment

In the stereoscopic vision systems 6 and 706 of the first and second preferred embodiments, the adjusted timing signal is generated by delaying the timing signal by the predetermined adjustment time Ta when the transmitting time adjustment cause exists, and the transmission signal is generated by adding the information on the adjustment time Ta to the adjusted timing signal. In contrast to this, in a stereoscopic vision system 806 of the present preferred embodiment, a transmission signal that is one wireless packet is generated by adding the information on the adjustment time Ta and the non-timing signal to the adjusted timing signal when the non-timing signal other than the timing signal is required to be wirelessly transmitted at a timing close to the timing signal. It is noted in the present preferred embodiment that components executing operations similar to those of the above-described preferred embodiments are denoted by the same reference numerals, and no description is provided for them.

Figure 7:
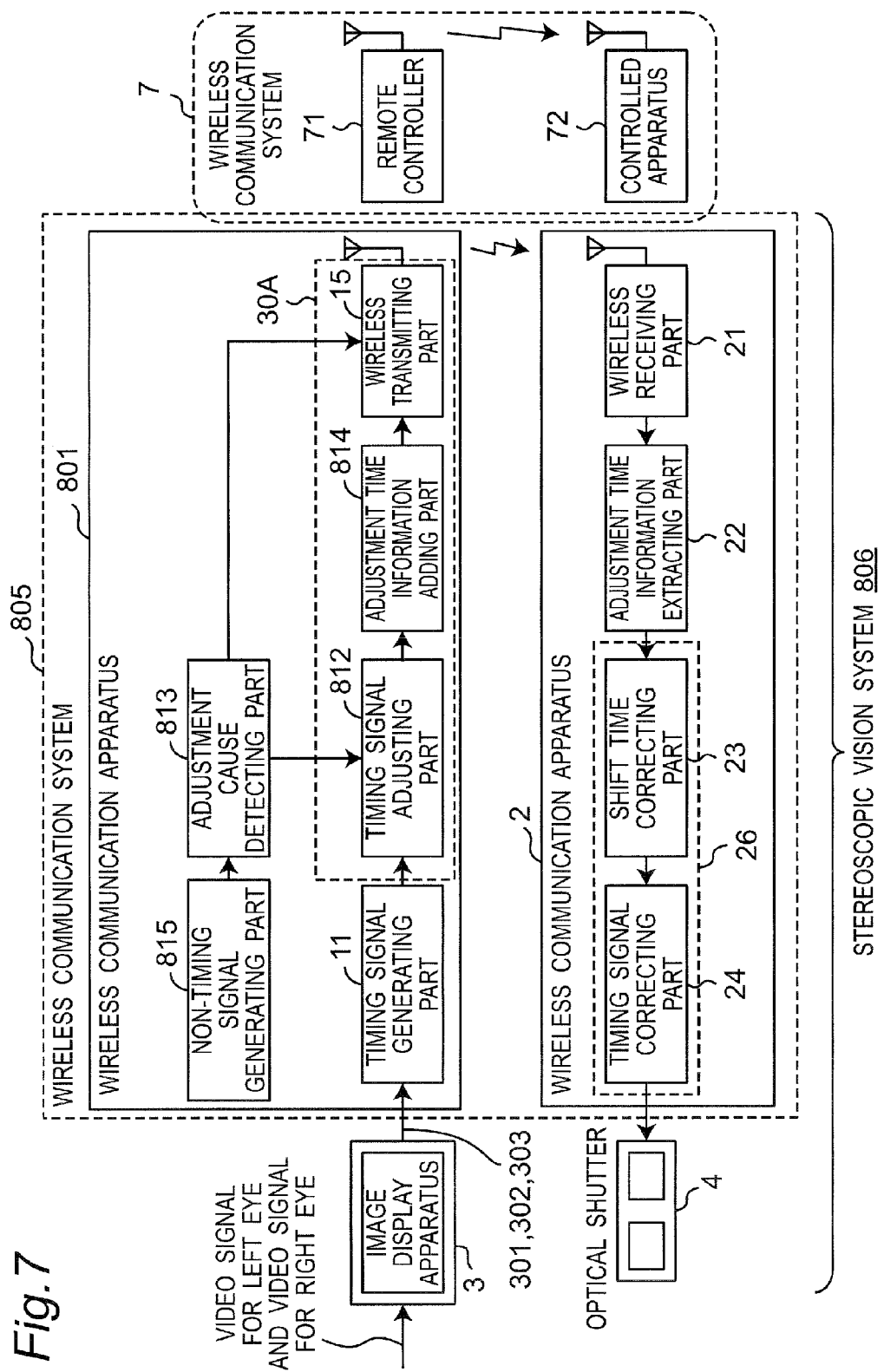
FIG. 7 is a block diagram showing a configuration of a stereoscopic vision system 806 according to a third preferred embodiment of the present invention.
Figure 8:
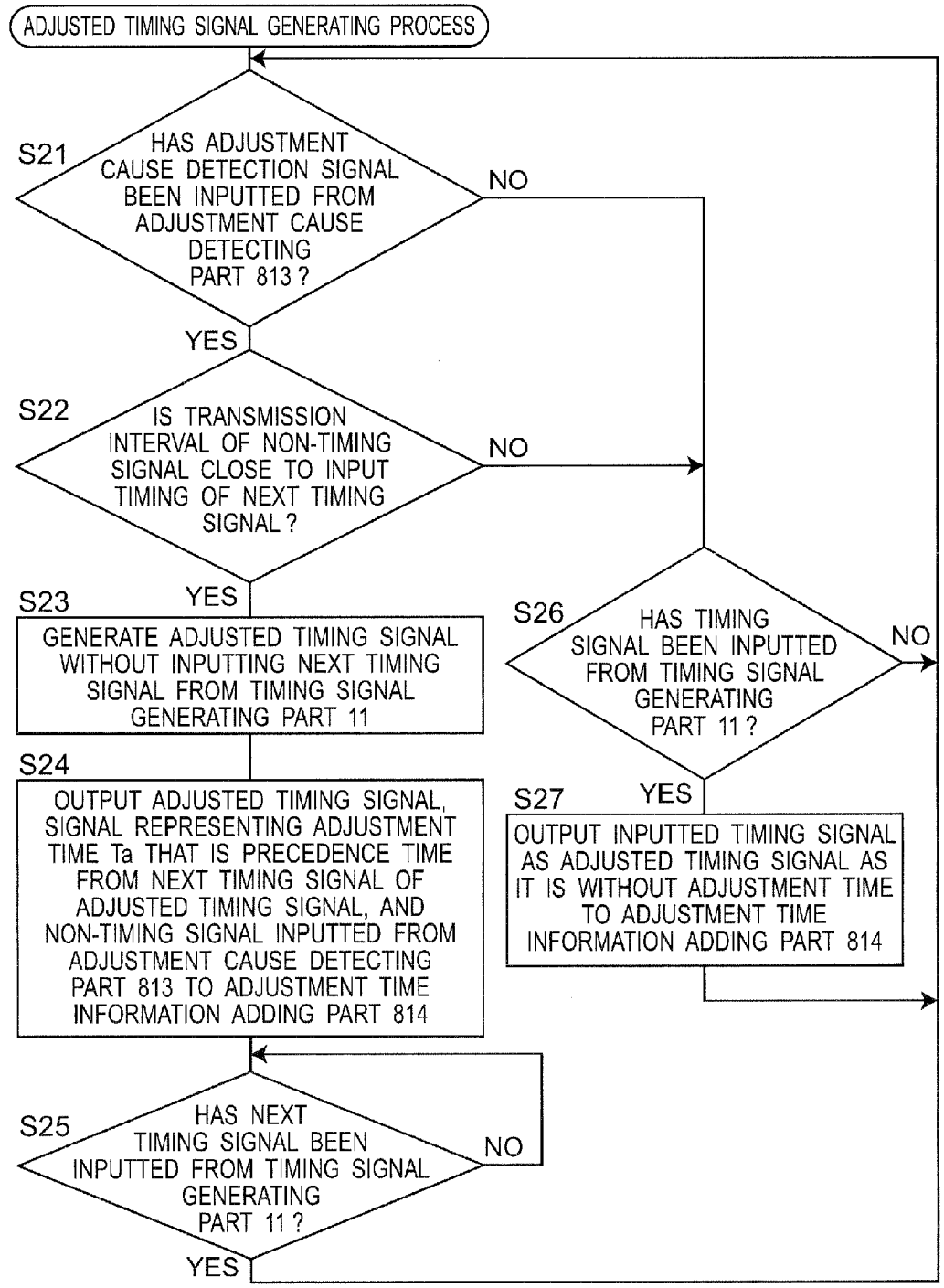
FIG. 8 is a flow chart showing an adjusted timing signal generating process executed by a timing signal adjusting part 812 of FIG. 7.
Figure 9:
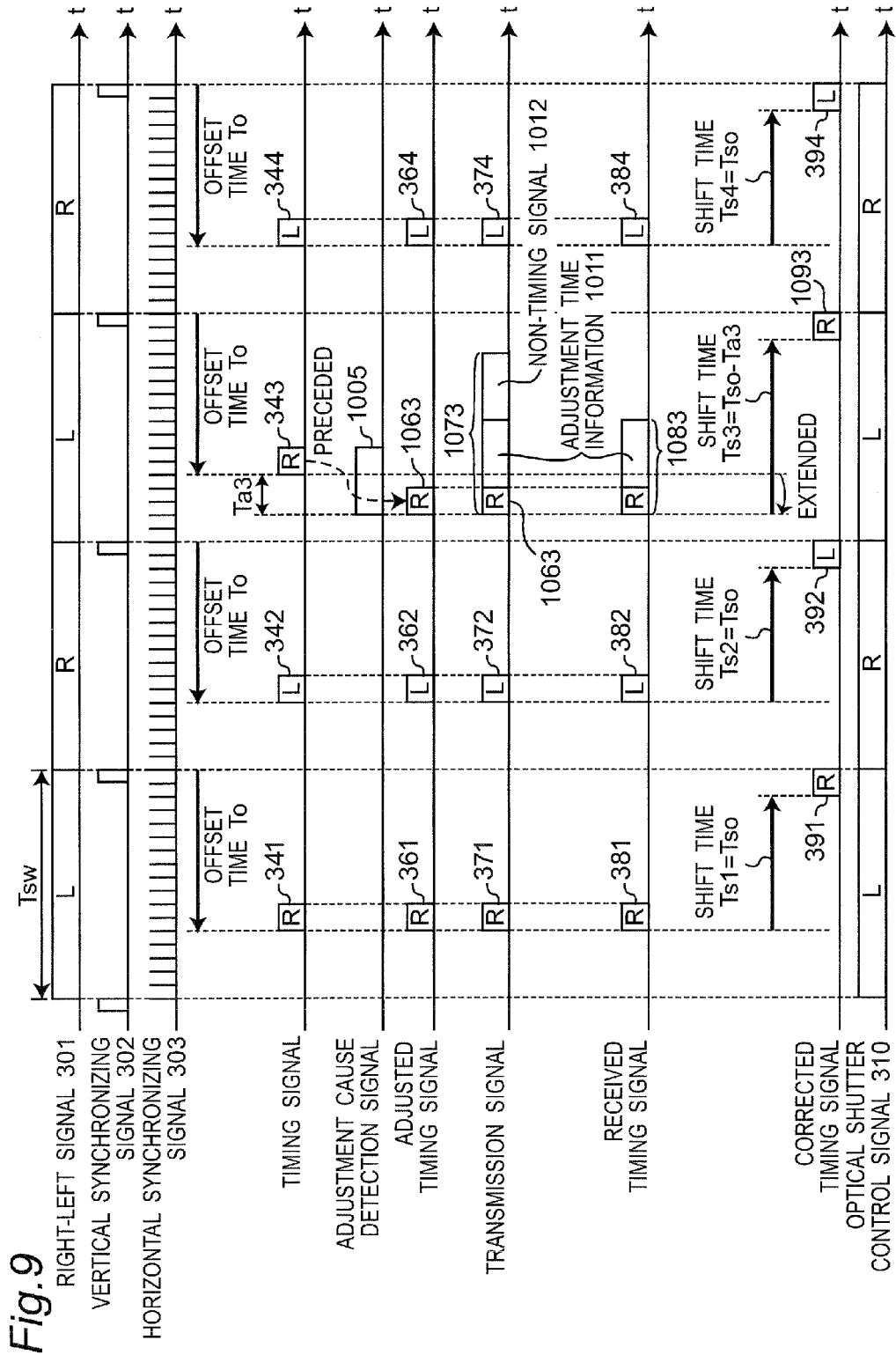
FIG. 9 is a timing chart showing operations of the stereoscopic vision system 806 of FIG. 7.

FIG. 7 is a block diagram showing a configuration of the stereoscopic vision system 806 according to the third preferred embodiment of the present invention. FIG. 8 is a flow chart showing an adjusted timing signal generating process executed by a timing signal adjusting part 812 of FIG. 7, and FIG. 9 is a timing chart showing operations of the stereoscopic vision system 806 of FIG. 7. Referring to FIG. 7, the stereoscopic vision system 806 includes a wireless communication system 805 in place of the wireless communication system 5 as compared with the stereoscopic vision system 6 of FIG. 1. In addition, the wireless communication system 805 includes a wireless communication apparatus 801 in place of the wireless communication apparatus 1 as compared with the wireless communication system 5. Further, the wireless communication apparatus 801 includes a non-timing signal generating part 815, an adjustment cause detecting part 813, and a timing signal generating part 30A including a timing signal adjusting part 812 and an adjustment time information adding part 814 in place of the timing signal generating part 30 as compared with the wireless communication apparatus 1.

Referring to FIG. 7, the non-timing signal generating part 815 generates a non-timing signal, and outputs the same signal to the adjustment cause detecting part 813. In this case, the non-timing signal is a signal other than the adjusted timing signal that is to be wirelessly transmitted to the wireless communication apparatus 2. For example, the non-timing signal is a packetized audio signal. In addition, before outputting the non-timing signal to the adjustment cause detecting part 813, the non-timing signal generating part 815 generates a control signal corresponding to the non-timing signal and outputs the control signal to the adjustment cause detecting part 813. For example, the control signal is a request signal that indicates the transmission interval of the non-timing signal and requests transmission of the non-timing signal. The adjustment cause detecting part 813 detects the transmission interval of the non-timing signal corresponding to the control signal based on the control signal from the non-timing signal generating part 815, and generates an adjustment cause detection signal that includes the information on the detected transmission interval. Further, the adjustment cause detecting part 813 outputs the adjustment cause detection signal and the non-timing signal from the non-timing signal generating part 815 to the timing signal adjusting part 812.

In addition, referring to FIG. 7, the timing signal adjusting part 812 executes the adjusted timing signal generating process of FIG. 8. At step S21 of FIG. 8, the timing signal adjusting part 812 judges whether or not the adjustment cause detection signal has been inputted from the adjustment cause detecting part 813. If YES at step S21, then the control flow goes to step S22. On the other hand, if NO at step S21, then the control flow goes to step S26. The timing signal adjusting part 812 judges at step S26 whether or not the timing signal has been inputted from the timing signal generating part 11. If YES at step S26, then the control flow goes to step S27. On the other hand, if NO at step S6, then the control flow returns to step S21. Further, at step S27, the timing signal adjusting part 812 outputs the timing signal inputted from the timing signal generating part 11 to the adjustment time information adding part 814 as it is without adjustment time as the adjusted timing signal, and thereafter, the control flow returns to step S21.

At step S22 of FIG. 8, the timing signal adjusting part 812 judges whether or not the transmission interval of the non-timing signal included in the adjustment cause detection signal is close to the input time of the next timing signal. Concretely speaking, at step S22, the timing signal adjusting part 812 calculates the time interval of the timing signal based on each input time of a predetermined number of latest timing signals that have already been inputted from the timing signal generating part 11, and calculates the time of inputting the next timing signal based on the input time of the timing signal inputted last and the calculated time interval. Further, the timing signal adjusting part 812 executes the judgment process at step S22 by judging whether or not a time difference between the calculated time and the start time of the transmission interval of the non-timing signal or a time difference between the calculated time and the end time of the transmission interval of the non-timing signal is within a predetermined time difference. If YES at step S22, then the control flow goes to step S23. On the other hand, if NO at step S22, then the control flow goes to step S26.

At step S23, the timing signal adjusting part 812 generates an adjusted timing signal without inputting the next timing signal from the timing signal generating part 11. By this operation, the adjusted timing signal is generated at timing substantially the same as the timing at which the adjustment cause detection signal is inputted from the adjustment cause detecting part 813.

Subsequent to step S23, the timing signal adjusting part 812 outputs at step S24 the adjusted timing signal, a signal representing the adjustment time Ta that is a time advanced from the timing signal next to the adjusted timing signal, and the non-timing signal inputted from the adjustment cause detecting part 813, to the adjustment time information adding part 814. Next, at step S25, the timing signal adjusting part 812 judges whether or not the next timing signal has been inputted from the timing signal generating part 11. If YES at step S25, then the control flow goes to step S21. On the other hand, if NO at step S25, then the process at step S25 is executed repetitively. As a result, when the adjusted timing signal is generated at step S24, the next timing signal from the timing signal generating part 11 is ignored.

By executing the adjusted timing signal generating process of FIG. 8, the timing signal adjusting part 812 adjusts the generating timing of the adjusted timing signal and the output timing of the non-timing signal so as to transmit the adjusted timing signal before the non-timing signal corresponding to the adjustment cause detection signal, when the adjustment cause detection signal is inputted from the adjustment cause detecting part 813.

Referring back to FIG. 7, when only the adjusted timing signal is inputted from the timing signal adjusting part 812, the adjustment time information adding part 814 outputs the inputted timing signal as a transmission signal as it is to the wireless transmitting part 15. In addition, when the adjusted timing signal and the signal representing the adjustment time Ta are inputted from the timing signal adjusting part 812, the adjustment time information adding part 814 adds adjustment time information representing the adjustment time Ta and the non-timing signal to the inputted adjusted timing signal, and outputs a resultant signal as a transmission signal to the wireless transmitting part 15.

In addition, referring to FIG. 7, the wireless receiving part 21 receives the wireless signal from the wireless transmitting part 15, converts the wireless signal into a received timing signal similar to that of the first preferred embodiment by executing a predetermined conversion process for the received wireless signal to separate the non-timing signal, and outputs a resultant signal to the adjustment time information extracting part 22.

Next, the operations of the stereoscopic vision system 806 of FIG. 7 are described with reference to FIG. 9. Referring to FIG. 9, the timing signal generating part 11 generates timing signals 341, 342, 343 and 344 in a manner similar to that of the first preferred embodiment (See FIG. 4). On the other hand, the non-timing signal generating part 815 generates a control signal such as a request signal that represents the transmission interval of a non-timing signal 1012 and requests transmission of the non-timing signal 1012, and outputs the control signal to the adjustment cause detecting part 813. The adjustment cause detecting part 813 detects the transmission interval of the non-timing signal 1012 corresponding to the control signal based on the control signal from the non-timing signal generating part 815, and outputs an adjustment cause detection signal 1005 including the detected information on the transmission interval and the non-timing signal 1012 to the timing signal adjusting part 812.

Referring to FIG. 9, no non-timing signal exists at the input time of the timing signals 341, 342 and 344. Therefore, the timing signals 341, 342 and 344 are wirelessly transmitted as transmission signals 371, 372 and 374 as they are to the wireless communication apparatus 2, and are converted into corrected timing signals 391, 392 and 394 in the wireless communication apparatus 2, in a manner similar to that of the first preferred embodiment.

On the other hand, referring to FIG. 9, the transmission interval of the non-timing signal 1012 corresponding to the adjustment cause detection signal 1005 is close to the input time of the next timing signal 343. Therefore, it is judged YES at step S22 of FIG. 8. Then, the timing signal adjusting part 812 generates an adjusted timing signal 1063 at the input time of the adjustment cause detection signal 1005. Namely, the timing signal adjusting part 812 adjusts the output timing of the timing signal 343 so that the output timing is advanced by the adjustment time Ta3, and generates the adjusted timing signal 1063. Further, the timing signal adjusting part 812 outputs the adjusted timing signal 1063 and the non-timing signal 1012 outputted from the adjustment cause detecting part 813, to the adjustment time information adding part 814.

Further, referring to FIG. 9, the adjustment time information adding part 814 receives the adjusted timing signals 361, 362, 1063 and 364, the information on the adjustment time Ta3 corresponding to the adjusted timing signal 1063, and the non-timing signal 1012 from the timing signal adjusting part 812. Then, the adjustment time information adding part 814 generates a transmission signal 1073 by adding adjustment time information 1011 that is the information on the adjustment time Ta3 and the non-timing signal 1012 to the adjusted timing signal 1063, of which the transmitting time has been adjusted by the adjustment time Ta3, among the adjusted timing signals 361, 362, 1063 and 364, and outputs the transmission signal 1073 to the wireless transmitting part 15. By this operation, in the case of FIG. 9, the transmitting time of the timing signal 343 is adjusted to the timing that precedes the same transmitting time by the adjustment time Ta3 so as to become the transmitting time of the adjustment cause detection signal 1005. In addition, the adjustment time information 1011 is added subsequently to the adjusted timing signal 1063, and the non-timing signal 1012 is added subsequently to the adjustment time information 1011. As described above, by transmitting the adjusted timing signal 1063 and the non-timing signal 1012 together in one wireless packet, the header required for each signal in the case of separate transmission can be transmitted only in one time, and the transmitting time can be effectively used.

Regarding the format of the adjustment time information 1011, any format is acceptable so long as the format includes information representing that the transmitting time of the timing signal is advanced and the adjustment time Ta for the advance. In the present preferred embodiment, the adjustment time Ta has a positive value when the timing signal is delayed, and the adjustment time Ta has a negative value when the timing signal is advanced.

Referring to FIG. 9, the wireless receiving part 21 receives a wireless signal from the wireless transmitting part 15, converts the wireless signal into received timing signals 381, 382 1083 and 384 by executing a predetermined conversion process for the received wireless signal and separating the non-timing signal 1012, and outputs the received timing signals 381, 382 1083 and 384 to the adjustment time information extracting part 22. The received timing signals 381, 382, 1083 and 384 are converted into corrected timing signals 391, 392, 1093 and 394 by the adjustment time information extracting part 22 and the corrected timing signal generating part 26 in a manner similar to that of the first preferred embodiment. It is noted that the adjustment time information 1011 included in the received timing signal 1083 includes the information that the timing signal 343 is advanced by the adjustment time Ta3, and therefore, the shift time Ts3 of the adjusted timing signal included in the received timing signal 1011 becomes time that is longer than the shift time Tso corresponding to the offset time To by the adjustment time Ta3. Namely, the shift time Tso is corrected and extended by the adjustment time Ta3.

As described above, according to the present preferred embodiment, the timing signal transmitting part 30A wirelessly transmits the adjusted timing signal in one wireless packet together with the adjustment time information and the non-timing signal. On the other hand, the corrected timing signal is generated in the wireless communication apparatus 2 in a manner similar to that of the first preferred embodiment. Therefore, even when the transmitting time adjustment cause that the wireless communication apparatus 801 wirelessly transmits the non-timing signal exists, the adjusted timing signal can be wirelessly transmitted when the transmitting time adjustment cause does not exist, and the switchover timing between the video signal for the left eye and the video signal for the right eye can be reproduced in the wireless communication apparatus 2 at accuracy higher than that of the prior art.

As shown in FIG. 9, in the present preferred embodiment, the transmitting time of the adjusted timing signal 1063 is set to the input time of the adjustment cause detection signal 1005, and the transmitting start time of the non-timing signal 1012 is adjusted to after the transmitting end time of the adjustment time information 1011 added to the adjusted timing signal 1063, however, the present invention is not limited to this. At least one of the adjusted timing signal and the non-timing signal may be adjusted in a manner that the adjusted timing signal, the adjustment time information corresponding to the adjusted timing signal and the non-timing signal are sequentially transmitted. Then, the transmission signal of one wireless packet that includes the adjusted timing signal, the adjustment time information corresponding to the adjusted timing signal and the non-timing signal may be generated in an arbitrary order. For example, the transmitting start time of the adjusted timing signal 1063 may be at the start time of the transmission interval of the non-timing signal 1012 included in the adjustment cause detection signal 1005, and the transmitting start time of the non-timing signal 1012 may be set at the transmitting end time of the adjustment time information 1011 added to the adjusted timing signal 1063.

In addition, in the present preferred embodiment, the non-timing signal generating part 815 generates the control signal corresponding to the non-timing signal such as the request signal that represents the transmission interval of the non-timing signal and requests the transmission of the non-timing signal before the non-timing signal is outputted to the adjustment cause detecting part 713, however, the present invention is not limited to this. The non-timing signal generating part 815 is required to generate the control signal that represents at least the transmission interval of the non-timing signal.

Further, in the present preferred embodiment, the timing signal adjusting part 812 adjusts the transmitting time of the adjusted timing signal so as to advance the generating timing of the timing signal by the timing signal generating part 11, however, the present invention is not limited to this. When the non-timing signal close to the timing signal is transmitted at time later than the generating timing of the timing signal by the timing signal generating part 11, the transmitting time of the adjusted timing signal is adjusted to be delayed by the adjustment time Ta. In this case, the shift time correcting part 23 corrects and shortens the shift time Ts of the received timing signal by the adjustment time Ta in a manner similar to that of the first preferred embodiment.

Still further, in the present preferred embodiment, the non-timing signal is wirelessly transmitted after the timing signal and the adjustment time information, however, the present invention is not limited to this. The adjusted timing signal and the adjustment time information may be wirelessly transmitted after the non-timing signal.

Fourth Preferred Embodiment

For example, in the case of a wireless communication system that performs communications with using the TDMA (Time Division Multiple Access) system or a wireless communication system that uses the slotted ALOHA system as a random access technique, it is desirable to perform wireless transmission in a predetermined time slot. In addition, even when specific communication system is not used, in a case where the apparatus is designed by utilizing the circuit of an existing wireless communication apparatus, the transmission of the wireless signal including the adjusted timing signal is sometimes allowed to be started only at a specified timing. In the present preferred embodiment, there will be explained a stereoscopic vision system 1106 in such a case where the transmitting time adjustment cause that the wireless transmission start timing of the adjusted timing signal is limited within a predetermined time interval due to a restriction on the setting of the wireless communication apparatus 1101 exists.

Figure 10:
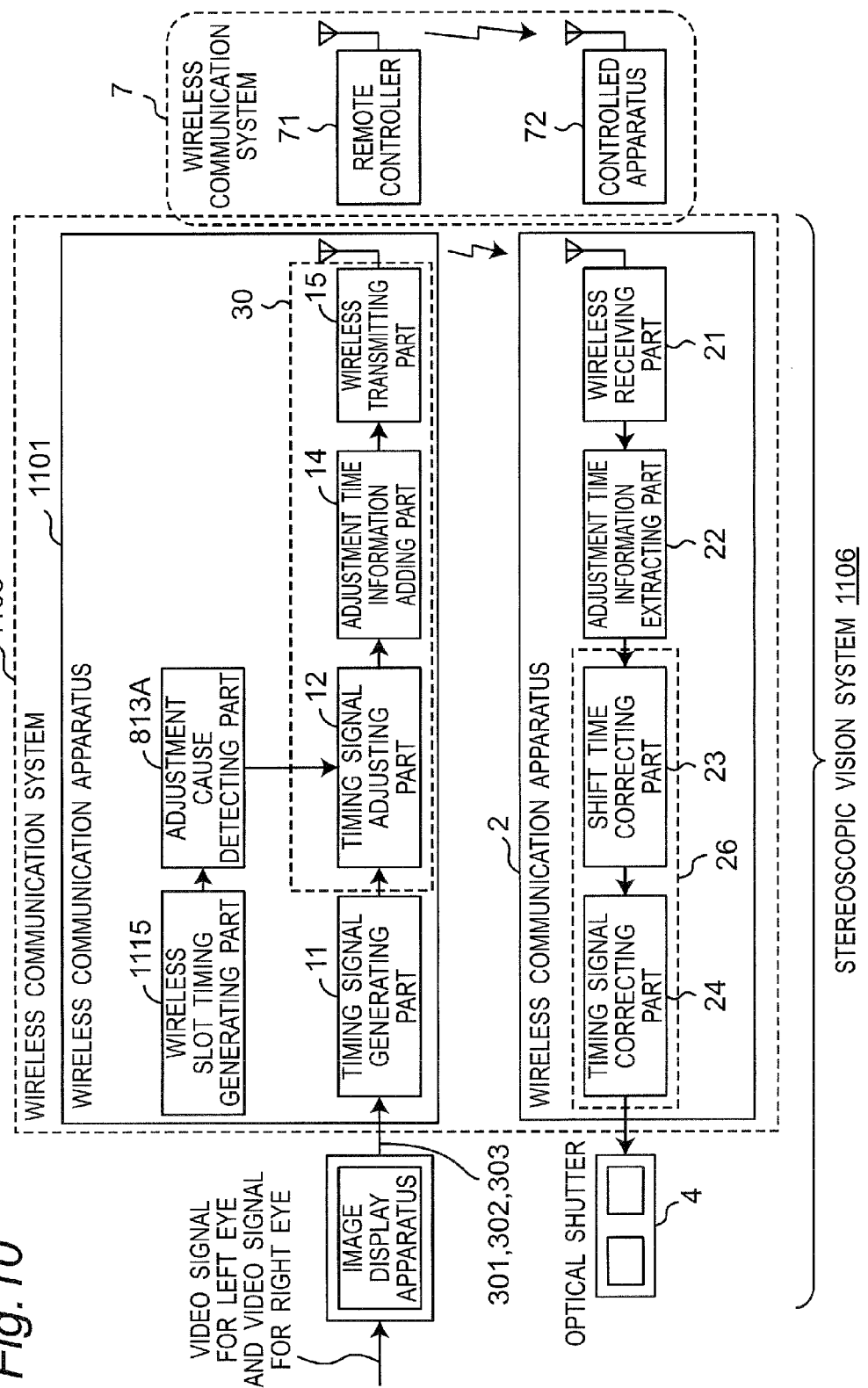
FIG. 10 is a block diagram showing a configuration of a stereoscopic vision system 1106 according to a fourth preferred embodiment of the present invention.

FIG. 10 is a block diagram showing a configuration of the stereoscopic vision system 1106 according to the fourth preferred embodiment of the present invention. Referring to FIG. 10, the stereoscopic vision system 1106 includes a wireless communication system 1105 in place of the wireless communication system 5 as compared with the stereoscopic vision system 6 of FIG. 1. In addition, the wireless communication system 1105 includes a wireless communication apparatus 1101 in place of the wireless communication apparatus 1 as compared with the wireless communication system 5. Further, the wireless communication apparatus 1101 includes a wireless slot timing generating part 1115 and an adjustment cause detecting part 813A in place of the adjustment cause detecting part 13 as compared with the wireless communication apparatus 1. It is noted in the present preferred embodiment that components executing operations similar to those of the above-described preferred embodiments are denoted by the same reference numerals, and no description is provided for them.

Referring to FIG. 10, the wireless slot timing generating part 1115 generates a wireless slot timing signal that represents a timing at which the transmission of the wireless signal including the adjusted timing signal can be started within the range of the restriction on the design of the communication protocol, and outputs the wireless slot timing signal to the adjustment cause detecting part 813A. Based on the wireless slot timing signal, the adjustment cause detecting part 813A generates an adjustment cause detection signal having the low level in a period during which the wireless signal including the adjusted timing signal can be transmitted, and generates an adjustment cause detection signal having the high level in a period during which the transmission of the wireless signal including the adjusted timing signal cannot be started. The adjustment cause detecting part 813A outputs the adjustment cause detection signal to the timing signal adjusting part 12.

Figure 11:
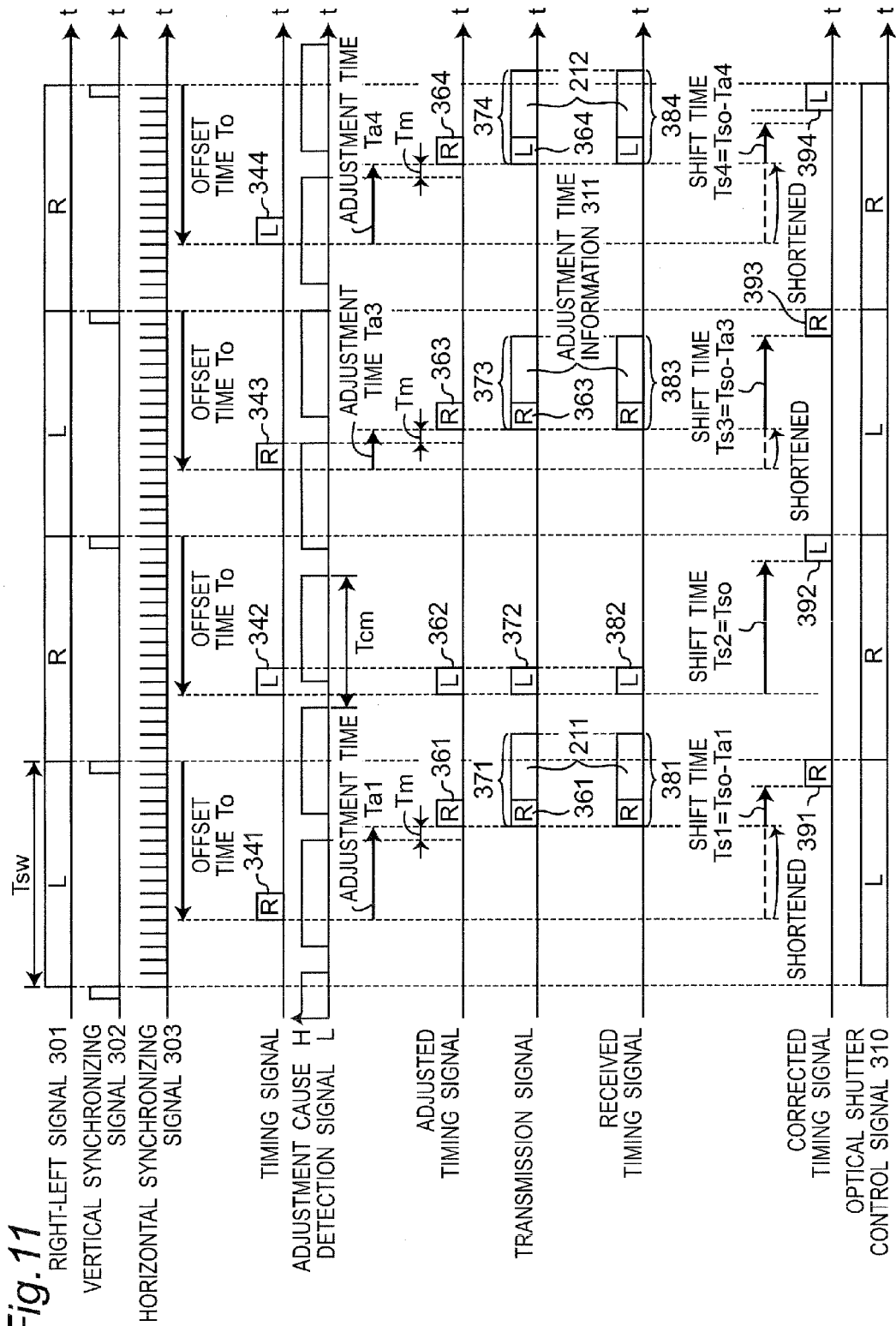
FIG. 11 is a timing chart showing operations of the stereoscopic vision system 1106 of FIG. 10.

FIG. 11 is a timing chart showing operations of the stereoscopic vision system 1106 of FIG. 10. Referring to FIG. 11, the adjustment cause detection signal from the adjustment cause detecting part 813A has a period Tcm shorter than the switchover period Tsw. In addition, a duration in which the voltage level of the adjustment cause detection signal is high level is longer than the duration in which the voltage level is low level. As a typical example, the period Tcm, the duration in which the voltage level is the high level, and the duration in which the voltage level is the low level are assumed to be constant, however, no trouble occurs in the operations of the preferred embodiment even when the period Tcm and the durations are not constant. Referring to FIG. 11, the timing signals 341 to 344 are generated in a manner similar to that of FIG. 4.

In this case, the adjustment cause detection signal having the high level is generated at the rise timing of each of the timing signals 341, 343 and 344 in FIG. 11. Therefore, the timing signal adjusting part 12 generates an adjusted timing signal 361 by stopping the output of the timing signal 341 until the output of the adjustment cause detection signal having the high level ends and delaying the timing signal 341 by an adjustment time Ta1, and outputs the adjusted timing signal 361 to the adjustment time information adding part 14 with a signal that represents the information on the adjustment time Ta1. Further, the timing signal adjusting part 12 generates an adjusted timing signal 363 by stopping the output of the timing signal 343 until the output of the high level adjustment cause detection signal ends and delaying the timing signal 343 by an adjustment time Ta3, and outputs the adjusted timing signal 363 to the adjustment time information adding part 14 with a signal that represents the information on the adjustment time Ta3. In addition, the timing signal adjusting part 12 generates an adjusted timing signal 364 by stopping the output of the timing signal 344 until the output of the high level adjustment cause detection signal ends and delaying the timing signal 344 by an adjustment time Ta4, and outputs the adjusted timing signal 364 to the adjustment time information adding part 14 with a signal that represents the information on the adjustment time Ta4.

In addition, since the adjustment cause detection signal having the low level is generated at the rise timing of the timing signal 342 in FIG. 11, the timing signal adjusting part 12 outputs the timing signal 342 as an adjusted timing signal 362 as it is without adjustment time to the adjustment time information adding part 14. The adjustment time information adding part 14 outputs the adjusted timing signal 362 as a transmission signal 372 to the wireless transmitting part 15. In addition, the adjustment time information adding part 14 adds adjustment time information 211, which is the information on the adjustment time Ta1, to the adjusted timing signal 361, and outputs a resultant signal to the wireless transmitting part 15 as a transmission signal 371. Further, the adjustment time information adding part 14 adds adjustment time information 311, which is the information on the adjustment time Ta3, to the adjusted timing signal 363, and outputs a resultant signal to the wireless transmitting part 15 as a transmission signal 373. Still further, the adjustment time information adding part 14 adds adjustment time information 212, which is the information on the adjustment time Ta4, to the adjusted timing signal 364, and outputs a resultant signal to the wireless transmitting part 15 as a transmission signal 374. The wireless transmitting part 15 converts the transmission signals 371 to 374 into wireless signals and transmits the wireless signals toward the wireless communication apparatus 2.

In the period during which the adjustment cause detection signal having the high level is generated, other wireless signals are not transmitted and received. Therefore, there is no problem even when the voltage level of the adjustment cause detection signal changes to the high level while the transmission is performed after the transmission of the wireless signal including the adjusted timing signal is started in the period during which the adjustment cause detection signal having the low level is generated.

According to the present preferred embodiment, even when the transmitting time adjustment cause that the wireless transmission start timing of the adjusted timing signal is limited within a predetermined time interval due to the restriction on the setting of the wireless communication apparatus 1101 exists, the wireless transmission of the adjusted timing signal can be started when the transmitting time adjustment cause does not exist, and the switchover timing between the video signal for the left eye and the video signal for the right eye can be more reproduced in the wireless communication apparatus 2 at accuracy higher than that of the prior art.

In the present preferred embodiment, the timing signal adjusting part 12 generates the adjusted timing signal by delaying the timing signal until the voltage level of the adjustment cause detection signal becomes low level, however, the present invention is not limited to this. The timing signal adjusting part 12 may estimate the period Tcm of the adjustment cause detection signal and the switchover period Tsw, and may advance (Ta<0) or delay (Ta>0) the timing signal so that the absolute value of the adjustment time Ta of the next timing signal becomes smaller based on the estimated period Tcm of the adjustment cause detection signal and the switchover period Tsw.

Fifth Preferred Embodiment

Figure 12:
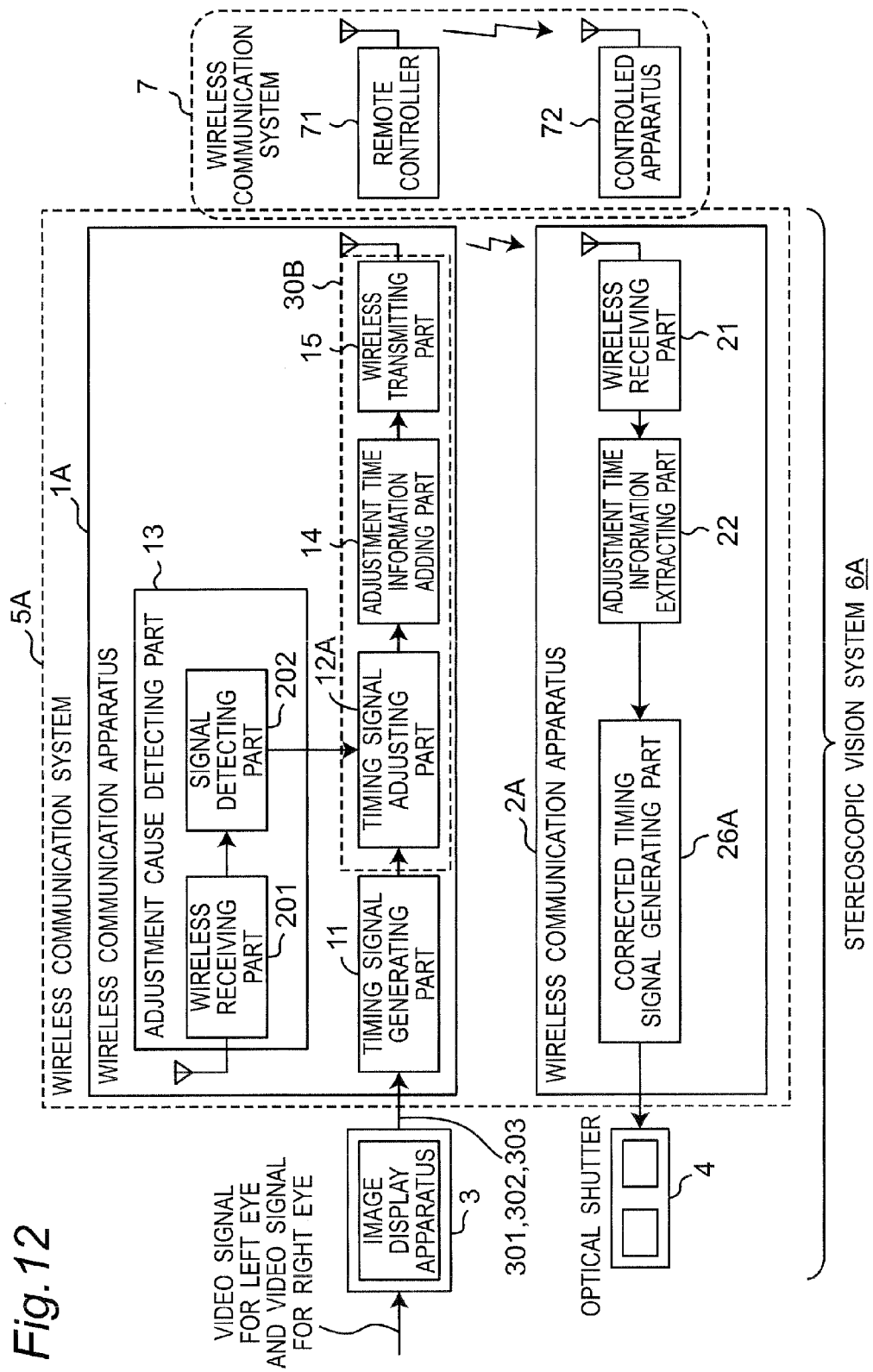
FIG. 12 is a block diagram showing a configuration of a stereoscopic vision system 6A according to a fifth preferred embodiment of the present invention.
Figure 13:
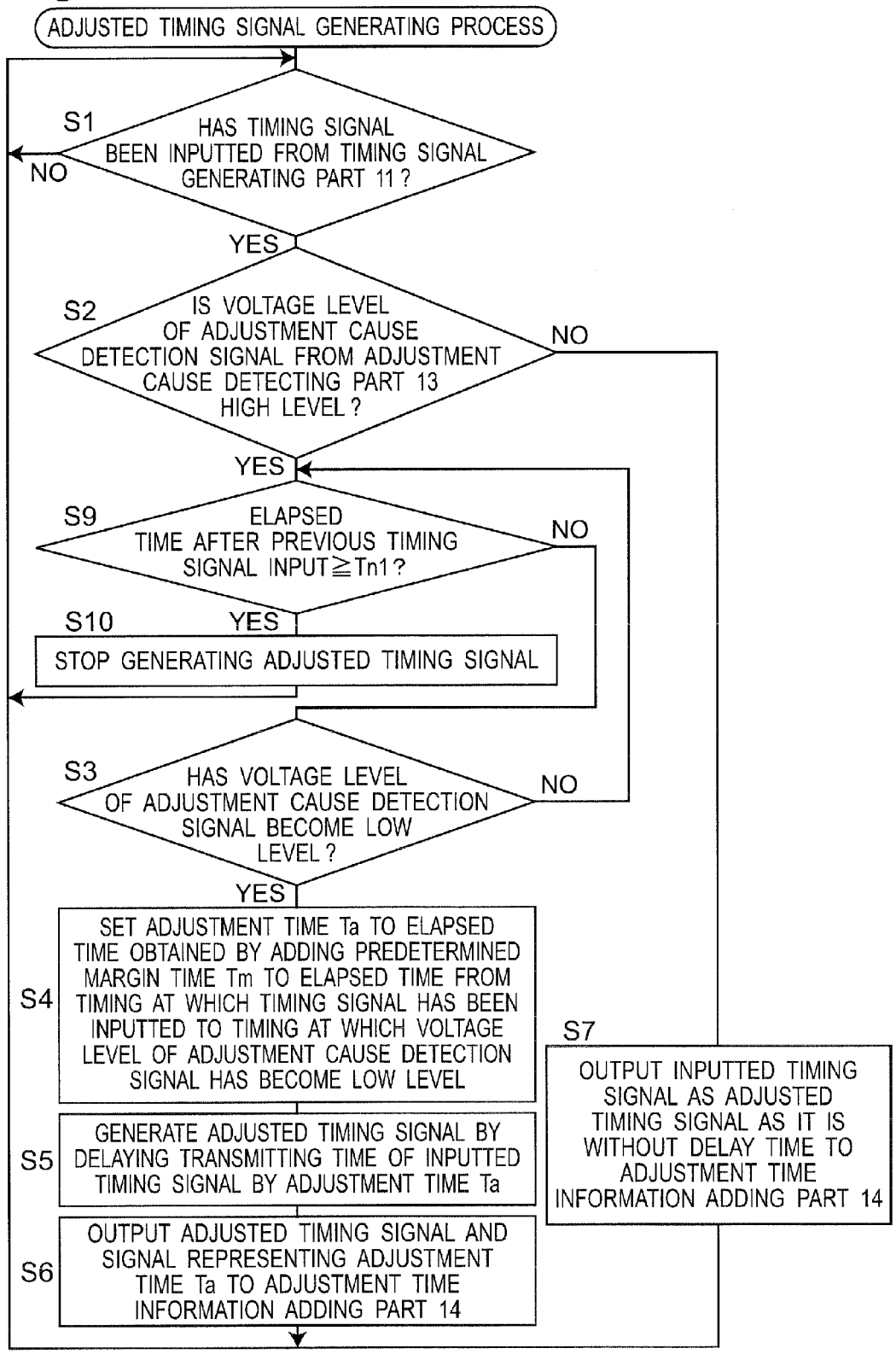
FIG. 13 is a flow chart showing an adjusted timing signal generating process executed by a timing signal adjusting part 12A of FIG. 12.
Figure 14:
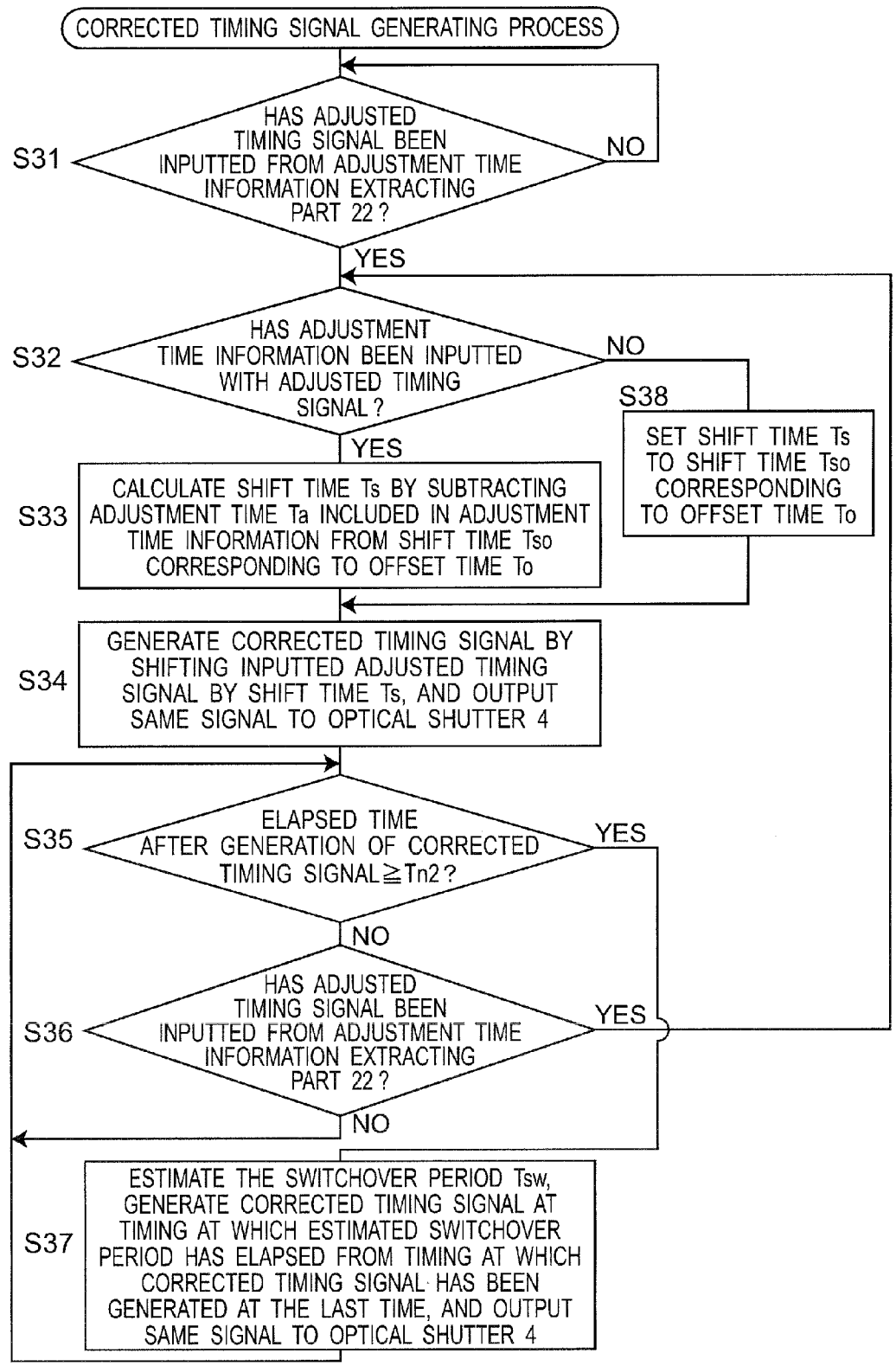
FIG. 14 is a flow chart showing a corrected timing signal generating process executed by a corrected timing signal generating part 26 of FIG. 12.
Figure 15:
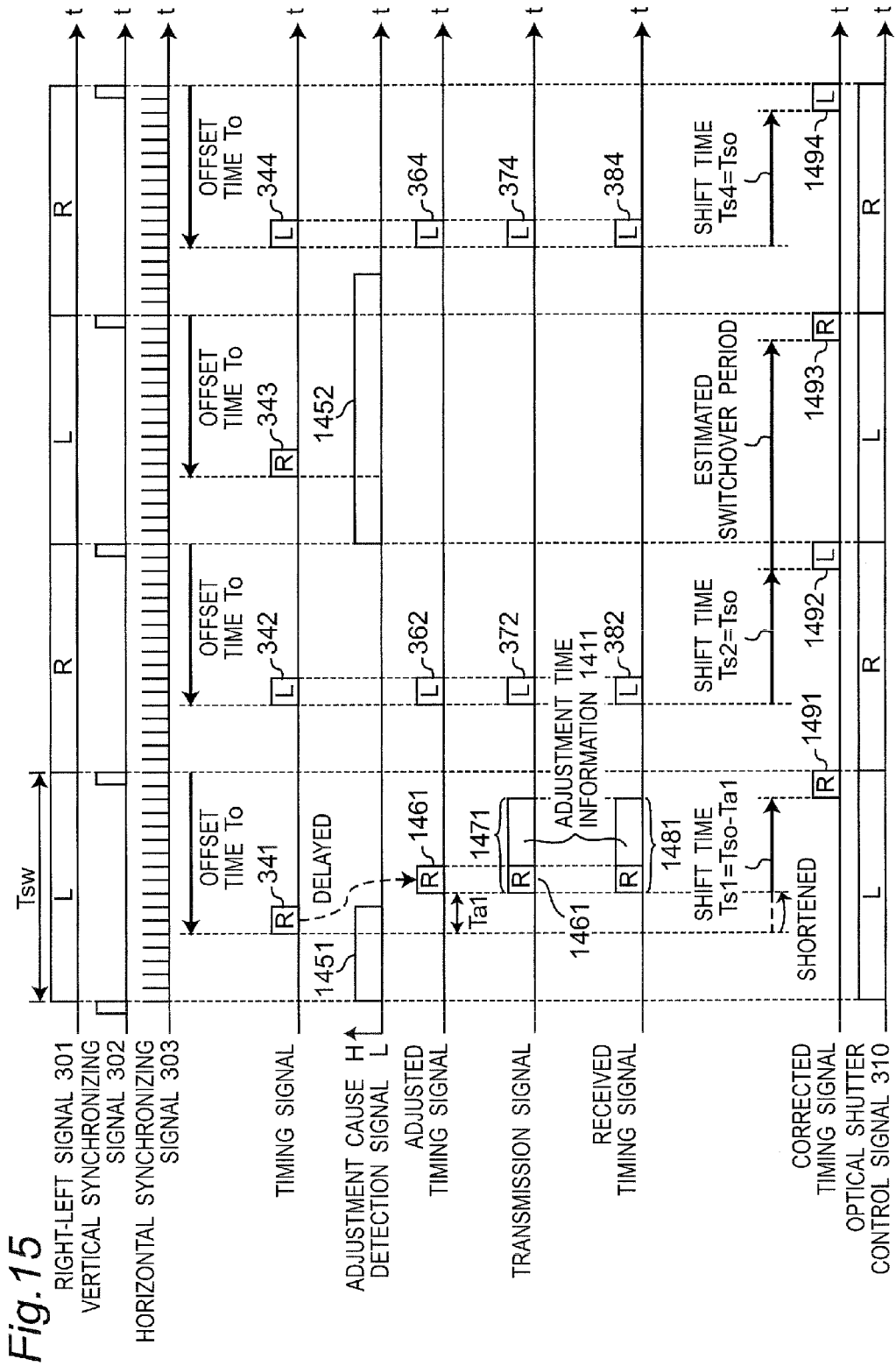
FIG. 15 is a timing chart showing operations of the stereoscopic vision system 6A of FIG. 12.

FIG. 12 is a block diagram showing a configuration of a stereoscopic vision system 6A according to the fifth preferred embodiment of the present invention. FIG. 13 is a flow chart showing an adjusted timing signal generating process executed by the timing signal adjusting part 12A of FIG. 12, and FIG. 14 is a flow chart showing a corrected timing signal generating process executed by a corrected timing signal generating part 26A of FIG. 12. Further, FIG. 15 is a timing chart showing operations of the stereoscopic vision system 6A of FIG. 12.

Referring to FIG. 12, the stereoscopic vision system 6A includes a wireless communication system 5A in place of the wireless communication system 5 as compared with the stereoscopic vision system 6 of FIG. 1. In addition, the wireless communication system 5A includes wireless communication apparatuses 1A and 2A in place of the wireless communication apparatuses 1 and 2 as compared with the wireless communication system 5. Further, the wireless communication apparatus 1A includes a timing signal transmitting part 30B including the timing signal adjusting part 12A, the adjustment time information adding part 14 and the wireless transmitting part 15 in place of the timing signal transmitting part 30 as compared with the wireless communication apparatus 1. The timing signal adjusting part 12A is provided in place of the timing signal adjusting part 12. The wireless communication apparatus 2A includes a corrected timing signal generating part 26A in place of the corrected timing signal generating part 26 as compared with the wireless communication apparatus 2. It is noted in the present preferred embodiment that components executing operations similar to those of the above-described preferred embodiments are denoted by the same reference numerals, and no description is provided for them.

The adjusted timing signal generating process executed by the timing signal adjusting part 12A is described with reference to FIG. 13. At step S1 of FIG. 13, the timing signal adjusting part 12A judges whether or not the timing signal has been inputted from the timing signal generating part 11. If YES at step S1, then the control flow goes to step S2. On the other hand, if NO at step S1, then the process of step S1 is executed repetitively. The timing signal adjusting part 12A judges at step S2 whether or not the voltage level of the adjustment cause detection signal from the adjustment cause detecting part 13 is high level. If YES at step S2, then the control flow goes to step S9. On the other hand, if NO at step S2, then when the control flow goes to step S7. When the voltage level of the adjustment cause detection signal is low level at the input time of the timing signal, the timing signal adjusting part 12A outputs the inputted timing signal as an adjusted timing signal as it is without any delay time to the adjustment time information adding part 14 at step S7, and the control flow returns to step S1.

In addition, at step S9 of FIG. 13, the timing signal adjusting part 12A judges whether or not an elapsed time after the input of a previous timing signal previous to the timing signal inputted at step S1 is equal to or larger than a predetermined elapsed time Tn1. If YES at step S9, then the control flow goes to step S10. In this case, the elapsed time Tn1 at step S9 is set to, for example, 1.9 times the switchover period Tsw. At step S10, the timing signal adjusting part 12A stops generating the adjusted timing signal, and the control flow returns to step S1. If NO at step S9, then the control flow goes to step S3 to execute the processes the same to those of steps S3 to S6 of FIG. 2 of the first preferred embodiment, and thereafter, the control flow returns to step S1.

Namely, upon detecting that the timing signal is inputted from the timing signal generating part 11 (YES at step S1), the timing signal adjusting part 12A judges whether or not a transmitting time adjustment cause exists at the transmitting time of the timing signal based on the adjustment cause detection signal (at step S2). When no transmitting time adjustment cause exists (NO at step S2), the timing signal adjusting part 12A outputs the timing signal as an adjusted timing signal (at step S7). When the transmitting time adjustment cause exists (YES at step S2) and the transmitting time adjustment cause disappears before an elapse of the elapsed time Tn1 after the input of the previous timing signal, the timing signal adjusting part 12A generates the adjusted timing signal by the processing of steps S4 to S6. In addition, when the transmitting time adjustment cause exists (YES at step S2) and the transmitting time adjustment cause does not disappear before an elapse of the elapsed time Tn1 after the input of the previous timing signal (YES at step S10), the timing signal adjusting part 12A stops generating the adjusted timing signal corresponding to the timing signal inputted at step S1.

With reference to FIG. 14, the corrected timing signal generating process executed by the corrected timing signal generating part 26A is described next. At step S31 of FIG. 14, the corrected timing signal generating part 26A judges whether or not the adjusted timing signal has been inputted from the adjustment time information extracting part 22. If YES at step S31, then the control flow goes to step S32. On the other hand, if NO at step S31, then the process at step S31 is executed repetitively. The corrected timing signal generating part 26A judges at step S32 whether or not the adjustment time information has been inputted with the adjusted timing signal. If YES at step S32, then the control flow goes to step S33. On the other hand, if NO at step S32, then the control flow goes to step S38. At step S33, the corrected timing signal generating part 26A calculates the shift time Ts by subtracting the adjustment time Ta included in the adjustment time information from the shift time Tso corresponding to the offset time To, and the control flow goes to step S34. On the other hand, the corrected timing signal generating part 26A sets the shift time Ts to the shift time Tso corresponding to the offset time To at step S38, and the control flow goes to step S34.

At step S34 of FIG. 14, the corrected timing signal generating part 26A generates a corrected timing signal by shifting the inputted adjusted timing signal by the shift time Ts, and outputs the corrected timing signal to the optical shutter 4. Next, the corrected timing signal generating part 26A judges at step S35 whether or not the elapsed time after the generation of the corrected timing signal at step S34 is equal to or larger than a predetermined elapsed time Tn2. If YES at step S35, then the control flow goes to step S37. On the other hand, if NO at step S35, then the control flow goes to step S36. In this case, the elapsed time Tn2 used at step S35 is set to a time obtained by, for example, adding the maximum value of a value that the adjustment time Ta can have to the switchover period Tsw. Then, it is judged at step S36 whether or not the adjusted timing signal has been inputted from the adjustment time information extracting part 22. If YES at step S36, then the control flow returns to step S32. On the other hand, if NO at step S36, then the control flow returns to step S35.

Further, at step S37 of FIG. 14, the corrected timing signal generating part 26A estimates the switchover period Tsw, generates the corrected timing signal at the timing at which the estimated switchover period has elapsed from the timing at which the corrected timing signal has been generated at the last time, and outputs the corrected timing signal to the optical shutter 4, and the control flow returns to step S35. Concretely speaking, at step S37, the corrected timing signal generating part 26A estimates the switchover period Tsw based on the generating time intervals of the predetermined number of corrected timing signals that have been already generated.

Namely, in the corrected timing signal generating process FIG. 14, upon detecting that the adjusted timing signal has been inputted from the adjustment time information extracting part 22 (YES at step S31), the corrected timing signal generating part 26A judges whether or not the adjustment time information has been inputted with the inputted adjusted timing signal (at step S32). Upon judging that the adjustment time information has been inputted (YES at step S32), the corrected timing signal generating part 26A calculates the shift time Ts of the inputted adjusted timing signal by subtracting the adjustment time Ta included in the adjustment time information from the predetermined shift time Tso corresponding to the offset time To (at step S33), generates the corrected timing signal obtained by adjusting (shifting) the inputted adjusted timing signal by the shift time Ts, and outputs the signal to the optical shutter 4 (at step S34).

Further, when it has not been detected that the adjustment time information has been inputted (NO at step S32) in the corrected timing signal generating process of FIG. 14, the corrected timing signal generating part 26A does not correct the shift time Ts of the inputted adjusted timing signal, and sets the shift time Ts to the predetermined shift time Tso (at step S38). When the next adjusted timing signal is not inputted from the adjustment time information extracting part 22 even when the elapsed time Tn2 has elapsed after the generating of the corrected timing signal generated at the last time (YES at step S35), the corrected timing signal generating part 26A generates the corrected timing signal without inputting the adjusted timing signal from the adjustment time information extracting part 22 (at step S37).

Next, the operation of the stereoscopic vision system 6A of FIG. 12 is described with reference to FIG. 15. Referring to FIG. 15, the duration from the generating time of a previous timing signal (not shown) previous to the timing signal 341 to the end of the output of an adjustment cause detection signal 1451 having the high level is smaller than the above-described elapsed time Tn1. In addition, the duration from the generating time of the timing signal 342 to the end of the output of an adjustment cause detection signal 1452 having the high level is equal to or larger than the above-described elapsed time Tn1. If the adjusted timing signal corresponding to the timing signal 343 is generated in a manner similar to that of the first preferred embodiment, then the transmission interval of the adjusted timing signal overlaps with the transmission interval of the next adjusted timing signal 364.

Referring to FIG. 15, the generation period of the timing signal 341 overlaps with the generation period of the adjustment cause detection signal 1451 having the high level. In addition, after generating a previous timing signal previous to the timing signal 341, the voltage level of the adjustment cause detection signal changes to low level before an elapse of the elapsed time Tn1. Therefore, the timing signal adjusting part 12A generates an adjusted timing signal 1461 that does not overlap with the generation period of the adjustment cause detection signal 1451 by delaying the output time of the timing signal 341 by the adjustment time Ta1. Then, a transmission signal 1471 obtained by adding adjustment time information 1411 including the information on the adjustment time Ta1 to the adjusted timing signal 1461 is generated and outputted to the wireless transmitting part 15.

In addition, since the adjustment cause detection signal having the high level is not generated at the generating time of the timing signal 342 in FIG. 15, the timing signal 342 is outputted as the adjusted timing signal 362 as it is to the adjustment time information adding part 14. Then, the adjusted timing signal 362 is outputted as the transmission signal 372 as it is to the wireless transmitting part 15. Further, referring to FIG. 15, the timing signal 344 is processed in a manner similar to that of the timing signal 342, and is outputted as the adjusted timing signal 364 as it is to the adjustment time information adding part 14. Then, the adjusted timing signal 364 is outputted as the transmission signal 374 as it is to the wireless transmitting part 15.

Further, referring to FIG. 15, the adjustment cause detection signal 1452 having the high level is outputted at the generating time of the timing signal 343. In addition, after the timing signal 342 is generated, the output of the adjustment cause detection signal 1452 ends after an elapse of the elapsed time Tn1. Therefore, if the timing signal 343 is processed in a manner similar to that of the timing signal 341, then the transmission interval of the adjusted timing signal corresponding to the timing signal 343 disadvantageously overlaps with the transmission interval of the next adjusted timing signal 364. According to the present preferred embodiment, in such a case, the timing signal adjusting part 12A cancels the transmission of the adjusted timing signal corresponding to the timing signal 343. Namely, the timing signal adjusting part 12A does not output the timing signal 343. Therefore, as shown in FIG. 15, no adjusted timing signal corresponding to the timing signal 343 exists between the adjusted timing signal 362 and the adjusted timing signal 364.

In addition, referring to FIG. 15, the transmission signals 1471, 372 and 374 are extracted as received timing signals 1481, 382 and 384, respectively, by the wireless receiving part 21. Then, the received timing signals 1481, 382 and 384 are processed in a manner similar to that of the first preferred embodiment by the adjustment time information extracting part 22 and the corrected timing signal generating part 26A, so that the corrected timing signals 1491, 1492 and 1494 are generated.

Further, referring to FIG. 15, the corrected timing signal generating part 26A does not receive the input of the next timing signal from the adjustment time information extracting part 22 even when the elapsed time Tn2 or more has elapsed after the generating of the corrected timing signal 1492. Therefore, the corrected timing signal generating part 26A estimates the switchover period Tsw, and inserts a corrected timing signal 1493 at time the estimated switchover period has elapsed after the corrected timing signal 1492 was outputted last. In the case of FIG. 15, since the corrected timing signal 1492 is the signal that represents the timing for switchover to the video signal for the left eye, the corrected timing signal 1493 that represents the timing for switchover to the video signal for the right eye is inserted.

In the present preferred embodiment, the corrected timing signal generating part 26A estimates the switchover period Tsw based on the generation period interval of a predetermined number of corrected timing signals that have been already generated, however, the present invention is not limited to this. The corrected timing signal generating part 26A may use a predetermined value determined by the format of the images being received in the image display apparatus 3 as the switchover period Tsw, use the receiving interval of predetermined two received timing signals as the switchover period Tsw, or use an average value of the receiving interval of a predetermined number of three or more received timing signals as the switchover period Tsw.

As described above, according to the present preferred embodiment, the timing signal transmitting part 30B stops generating the adjusted timing signal corresponding to the timing signal to be processed, when the transmitting time adjustment cause is detected by the adjustment cause detecting part 13 at the input time of the timing signal and the transmitting time adjustment cause exists until the predetermined elapsed time Tn1 elapses from the generating timing of the previous timing signal previous to the timing signal to be processed. In addition, the corrected timing signal generating part 26A generates the next corrected timing signal based on the period of the corrected timing signal that have been already generated when the next adjusted timing signal is not inputted from the adjustment time information extracting part 22 until the elapsed time Tn2 elapses after the generating of the corrected timing signal. Therefore, when the duration of the period during which the transmitting time adjustment cause exists is longer than, for example, the switchover period Tsw, the switchover timing between the video signal for the left eye and the video signal for the right eye can be reproduced in the wireless communication apparatus 2A at accuracy higher than that of the first preferred embodiment.

In the present preferred embodiment, the elapsed time Tn1 is set to the switchover period Tsw and the elapsed time Tn2 is set to the time obtained by adding the maximum value of the values that the adjustment time Ta can have to the switchover period Tsw, however, the present invention is not limited to this. When the adjusted timing signal is generated when the transmitting time adjustment cause has disappeared, the elapsed times Tn1 and Tn2 may be set so that the adjusted timing signal does not temporally overlap with the adjusted timing signal that should be generated next.

In addition, the configuration of the present preferred embodiment may be applied to the first to fourth preferred embodiments.

Sixth Preferred Embodiment

Figure 16:
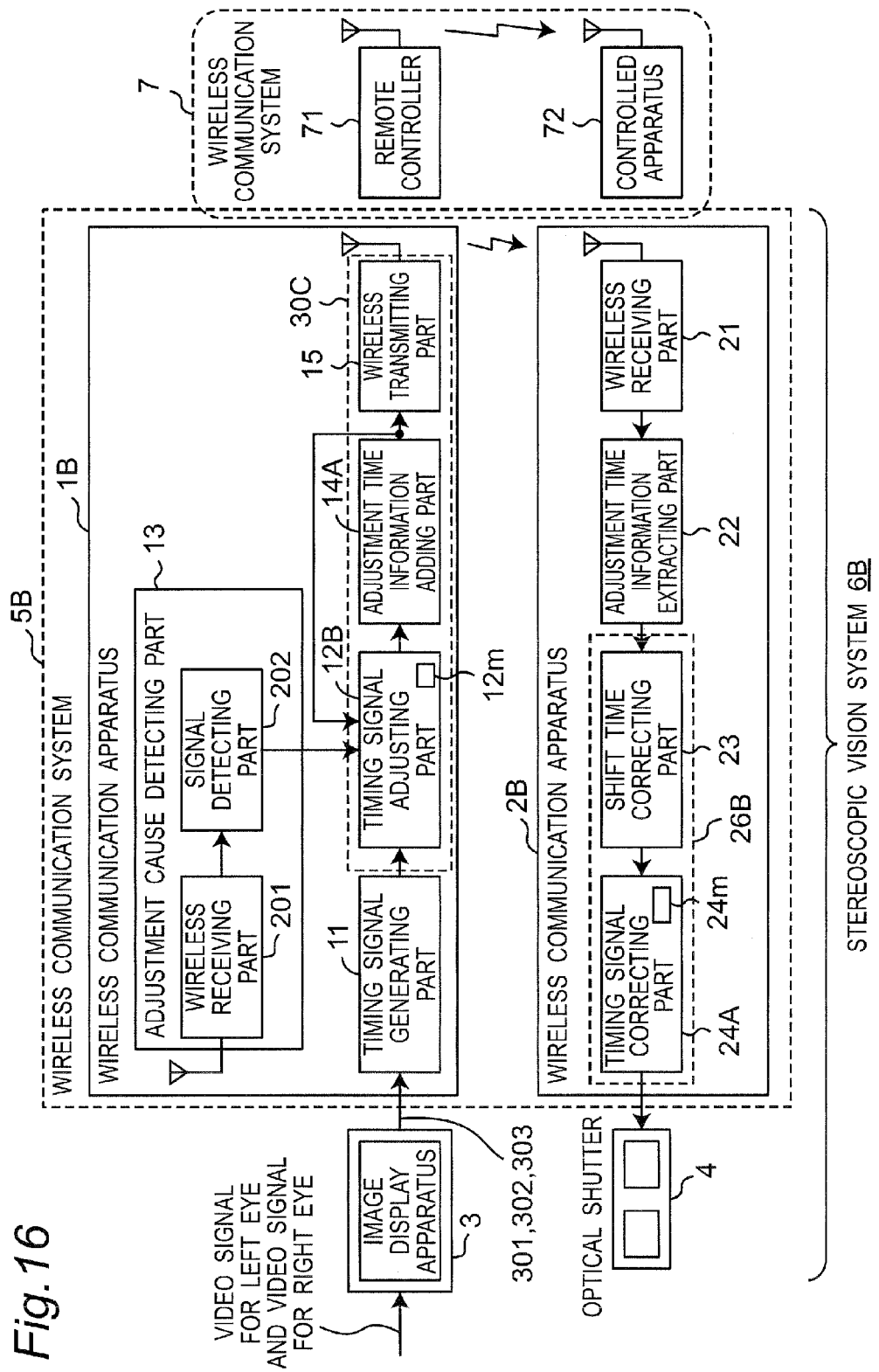
FIG. 16 is a block diagram showing a configuration of a stereoscopic vision system 6B according to a sixth preferred embodiment of the present invention.
Figure 17:
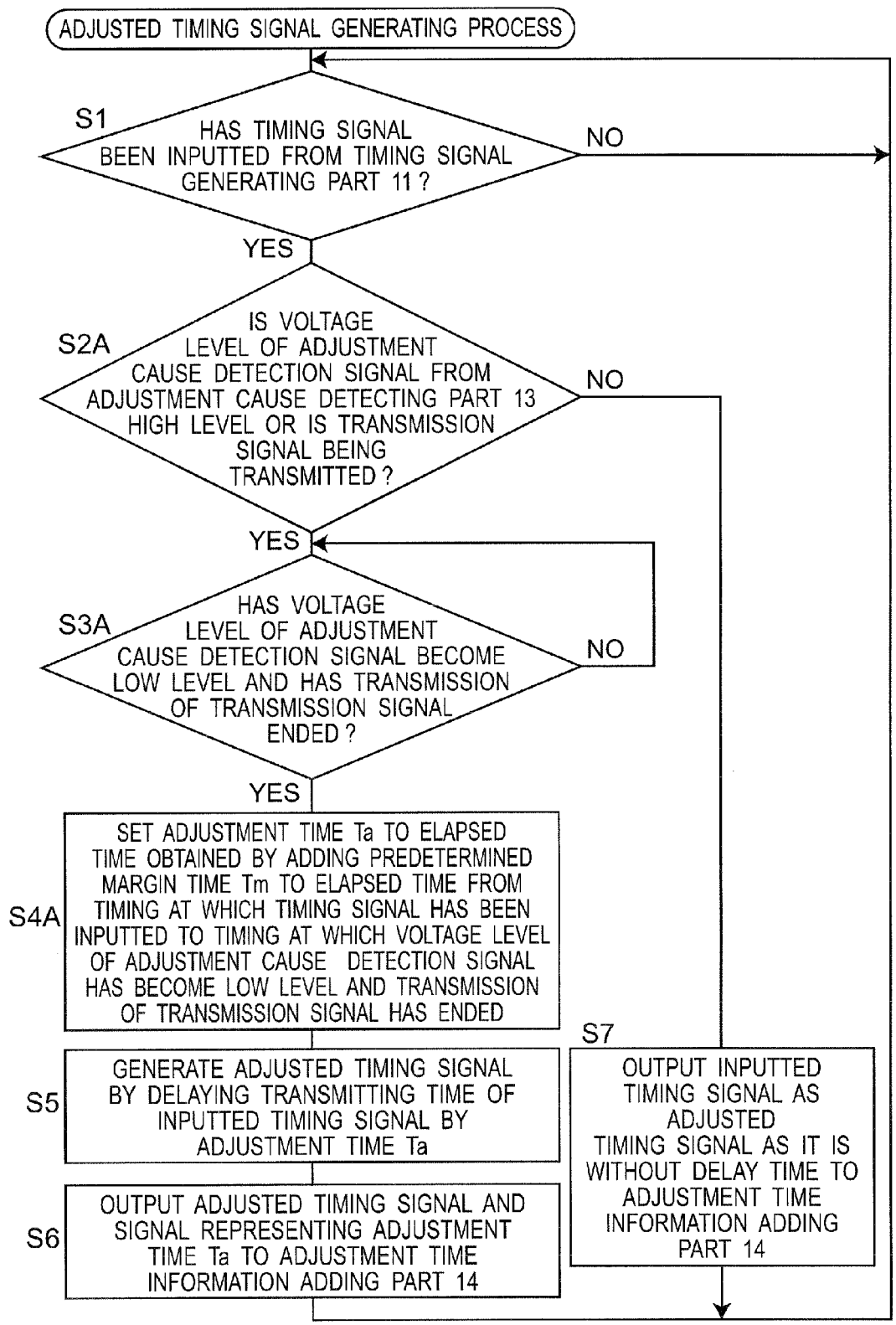
FIG. 17 is a flow chart showing an adjusted timing signal generating process executed by a timing signal adjusting part 12B of FIG. 16.
Figure 18:
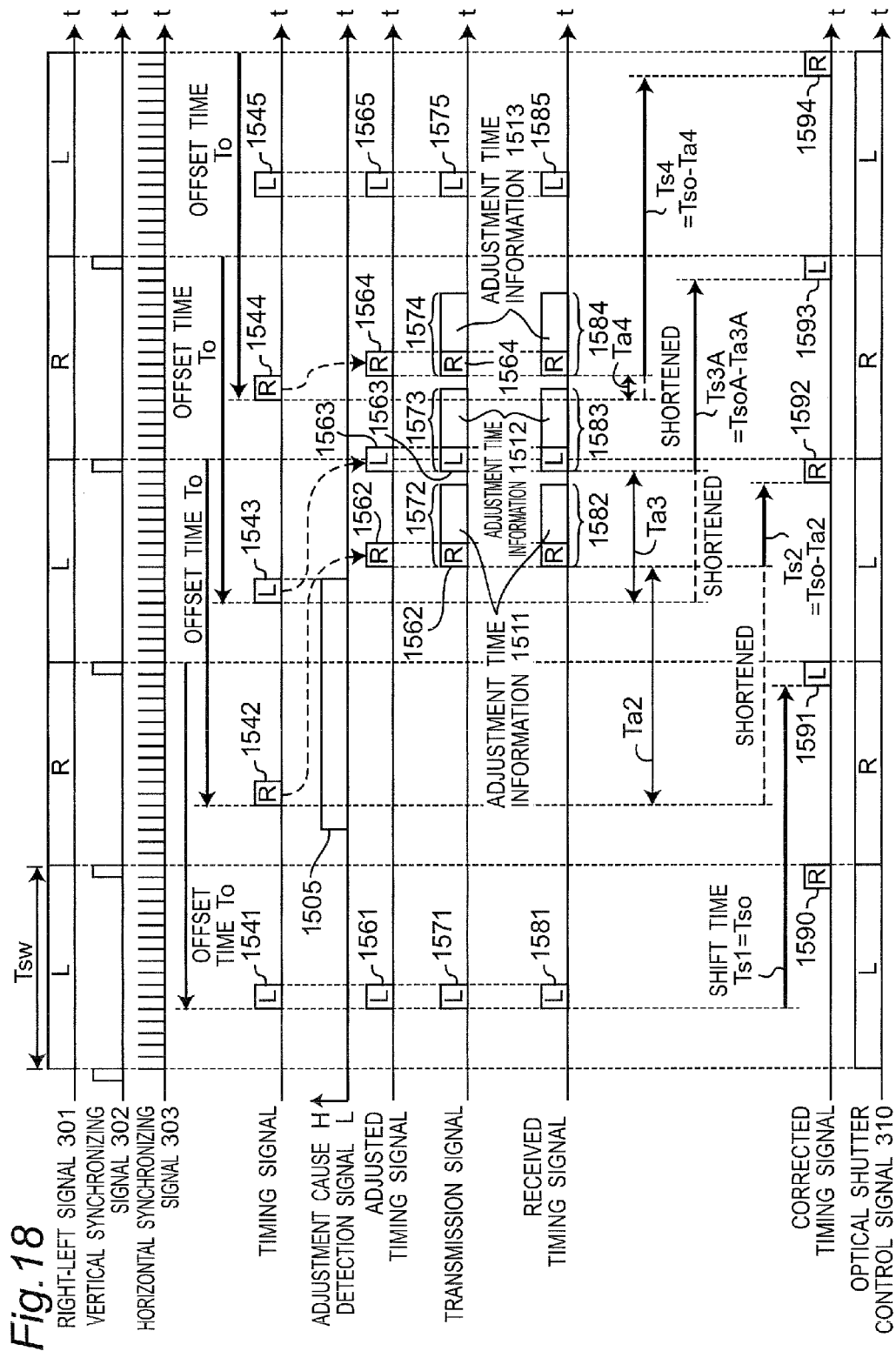
FIG. 18 is a timing chart showing operations of the stereoscopic vision system 6B of FIG. 16.

FIG. 16 is a block diagram showing a configuration of a stereoscopic vision system 6B according to the sixth preferred embodiment of the present invention. FIG. 17 is a flow chart showing an adjusted timing signal generating process executed by the timing signal adjusting part 12B of FIG. 16, and FIG. 18 is a timing chart showing operations of the stereoscopic vision system 6B of FIG. 16.

Referring to FIG. 16, the stereoscopic vision system 6B includes a wireless communication system 5B in place of the wireless communication system 5 as compared with the stereoscopic vision system 6 of FIG. 1. In addition, the wireless communication system 5B includes wireless communication apparatuses 1B and 2B in place of the wireless communication apparatuses 1 and 2 as compared with the wireless communication system 5. Further, the wireless communication apparatus 1B includes a timing signal transmitting part 30C that has a timing signal adjusting part 12B, an adjustment time information adding part 14A and a wireless transmitting part 15 in place of the timing signal transmitting part 30 as compared with the wireless communication apparatus 1. In addition, the wireless communication apparatus 2B includes a corrected timing signal generating part 26B in place of the corrected timing signal generating part 26 as compared with the wireless communication apparatus 2, and the corrected timing signal generating part 26B includes a timing signal correcting part 24A in place of the timing signal correcting part 24 as compared with the corrected timing signal generating part 26. It is noted in the present preferred embodiment that components executing operations similar to those of the above-described preferred embodiments are denoted by the same reference numerals, and no description is provided for them. Referring to FIG. 16, it is noted that the timing signal adjusting part 12B includes a storage part 12m, and the timing signal correcting part 24A includes a storage part 24m.

Referring to FIG. 16, in a manner similar to that of the first preferred embodiment, the timing signal generating part 11 generates a timing signal that represents the switchover timing from the video signal for the left eye to the video signal for the right eye at a timing that precedes the start timing of the video signal for the right eye by a predetermined offset time To by using the inputted right-left signal 301, the vertical synchronizing signal 302 and the horizontal synchronizing signal 303, and generates a timing signal that represents the switchover timing from the video signal for the right eye to the video signal for the left eye at a timing that precedes the start timing of the video signal for the left eye by the predetermined offset time To. It is noted in the present preferred embodiment that the offset time To is set to duration longer than the switchover period Tsw. For example, the offset time To is set to 1.5 times the switchover period Tsw.

Referring to FIG. 16, the timing signal adjusting part 12B generates an adjusted timing signal by executing the adjusted timing signal generating process of FIG. 17, and outputs the adjusted timing signal to the adjustment time information adding part 14A with a signal that represents the adjustment time Ta. In addition, the adjustment time information adding part 14A generates a transmission signal as described in detail later, and outputs the transmission signal to the timing signal adjusting part 12B and the wireless transmitting part 15.

With reference to FIG. 17, the adjusted timing signal generating process executed by the timing signal adjusting part 12B is described. The adjusted timing signal generating process of FIG. 17 has such a configuration that the steps S2, S3 and S4 of the adjusted timing signal generating process of FIG. 2 are replaced with steps S2A, S3A and S4A, respectively. Only the processes of steps S2A, S3A and S4A are described below.

At step S2A of FIG. 17, the timing signal adjusting part 12B judges whether or not the voltage level of the adjustment cause detection signal from the adjustment cause detecting part 13 is high level or the wireless communication apparatus 1B is transmitting the transmission signal. Concretely speaking, when the timing signal adjusting part 12B is inputting the transmission signal from the adjustment time information adding part 14A, it is judged that the wireless communication apparatus 1B is transmitting the transmission signal. In addition, at step S3A, the timing signal adjusting part 12B judges whether or not the voltage level of the adjustment cause detection signal has become low level and the transmission of the transmission signal has ended. Further, at step S4A, the timing signal adjusting part 12B sets the adjustment time Ta to an elapsed time obtained by adding a predetermined margin time Tm to an elapsed time from a timing at which the timing signal is inputted at step S1 to a timing at which the voltage level of the adjustment cause detection signal has become low level at step S3A and the transmission of the transmission signal has ended.

Namely, upon detecting that the timing signal is inputted from the timing signal generating part 11 (YES at step S1), the timing signal adjusting part 12B judges the presence or absence of the transmitting time adjustment cause and the presence or absence of the transmission signal in the transmission interval of the timing signal based on the adjustment cause detection signal from the adjustment cause detecting part 13 and the transmission signal from the adjustment time information adding part 14A (at step S2A). Further, when the answer is NO at step S2A, the timing signal adjusting part 12B outputs the timing signal as an adjusted timing signal as it is to the adjustment time information adding part 14A (at step S7), and the control flow returns to step S1. When the answer is YES at step S2A, the timing signal adjusting part 12B generates an adjusted timing signal by setting the adjustment time Ta so that the transmission interval of the adjusted timing signal does not overlaps with the period during which the transmitting time adjustment cause exists and the period during which the transmission signal is being transmitted, and adjusting the transmitting time of the timing signal by the adjustment time Ta (at step S5). It is noted that the timing signal adjusting part 12B has the possibility of inputting the next timing signal from the timing signal generating part 11 while the adjusted timing signal is being generated. Therefore, the timing signal adjusting part 12B stores the information on each timing signal from the timing signal generating part 11 into the storage part 12m.

Referring to FIG. 16, when only the adjusted timing signal is inputted from the timing signal adjusting part 12, the adjustment time information adding part 14A outputs the inputted adjusted timing signal as a transmission signal as it is to the wireless transmitting part 15 and the timing signal adjusting part 12B. In addition, when the adjusted timing signal and a signal that represents the adjustment time Ta are inputted from the timing signal adjusting part 12, the adjustment time information adding part 14 adds the adjustment time information that represents the adjustment time Ta to the inputted adjusted timing signal, and outputs a resultant signal to the wireless transmitting part 15 and the timing signal adjusting part 12B as a transmission signal.

In addition, referring to FIG. 16, the corrected timing signal generating part 26B executes the corrected timing signal generating process (FIG. 3) of the first preferred embodiment. In this case, the timing signal correcting part 24A operates in a manner similar to that of the timing signal correcting part 24 of FIG. 1. In the present preferred embodiment, it is noted that the shift time Ts becomes longer than that of the first preferred embodiment since the offset time To is longer than that of the first preferred embodiment (See, for example, the shift times Ts1 to Ts4 of FIG. 18). Therefore, the timing signal correcting part 24A has the possibility of inputting the next adjusted timing signal while the adjusted timing signal from the shift time correcting part 23 is being processed, and it is required to sequentially correct the output timing of the plurality of adjusted timing signals from the shift time correcting part 23. Therefore, the timing signal correcting part 24A stores the information on each timing signal from the shift time correcting part 23 into the storage part 24m.

With reference to FIG. 18, the operation of the stereoscopic vision system 6B of FIG. 16 is described next. Referring to FIG. 18, the timing signal generating part 11 generates timing signals 1541 to 1545. Referring to FIG. 18, the offset time To is set to about 1.7 times the switchover period Tsw. In addition, an adjustment cause detection signal 1505 having the high level is generated from a time before the time of generation of the timing signal 1542 to the end time of the generation period of the next timing signal 1543.

Referring to FIG. 18, since the generation period of the timing signal 1541 does not overlap with the transmission interval of the transmission signal and the voltage level of the adjustment cause detection signal is low level, the timing signal 1541 is outputted as an adjusted timing signal 1561 as it is to the adjustment time information adding part 14A. Further, the adjusted timing signal 1561 is wirelessly transmitted as a transmission signal 1571 to the wireless communication apparatus 2B. The transmission signal 1571 is extracted as a received timing signal 1581 in the wireless communication apparatus 2B, and a corrected timing signal 1591 is generated based on the received timing signal 1581.

In addition, referring to FIG. 18, the generation period of the timing signal 1542 overlaps with the generation period of the adjustment cause detection signal 1505 having the high level. Therefore, the timing signal adjusting part 12B adjusts the adjustment time Ta2 so that an adjusted timing signal 1562 corresponding to the timing signal 1542 is outputted to the adjustment time information adding part 14A after the end of the output of the adjustment cause detection signal 1505. Further, the adjustment time information adding part 14A generates a transmission signal 1572 by adding adjustment time information 1511 including the information on the adjustment time Ta2 to the adjusted timing signal 1562, and outputs the transmission signal 1572 to the wireless transmitting part 15 and the timing signal adjusting part 12B. The transmission signal 1572 is extracted as a received timing signal 1582 in the wireless communication apparatus 2B, and a corrected timing signal 1592 is generated based on the received timing signal 1582.

Further, referring to FIG. 18, based on the transmission signal 1572 from the adjustment time information adding part 14A, the timing signal adjusting part 12B detects that the transmission signal 1572 is being transmitted after the output of the adjusted timing signal 1562. Therefore, the timing signal adjusting part 12B adjusts the adjustment time Ta3 so that the adjusted timing signal 1563 corresponding to the timing signal 1543 is outputted to the adjustment time information adding part 14A after the transmission of the transmission signal 1572. Further, the adjustment time information adding part 14A generates a transmission signal 1573 by adding adjustment time information 1512 including the information on the adjustment time Ta3 to the adjusted timing signal 1563, and outputs the transmission signal 1573 to the wireless transmitting part 15 and the timing signal adjusting part 12B. The transmission signal 1573 is extracted as a received timing signal 1583 in the wireless communication apparatus 2B, and a corrected timing signal 1593 is generated based on the received timing signal 1583.

Further, referring to FIG. 18, based on the transmission signal 1573 from the adjustment time information adding part 14A, the timing signal adjusting part 12B detects that the transmission signal 1573 is being transmitted after the output of the adjusted timing signal 1563. Therefore, the timing signal adjusting part 12B adjusts the adjustment time Ta4 so that an adjusted timing signal 1564 corresponding to the timing signal 1544 is outputted to the adjustment time information adding part 14A after the transmission of the transmission signal 1573. Further, the adjustment time information adding part 14A generates a transmission signal 1574 by adding adjustment time information 1513 including the information on the adjustment time Ta4 to the adjusted timing signal 1564, and outputs the transmission signal 1574 to the wireless transmitting part 15 and the timing signal adjusting part 12B. The transmission signal 1574 is extracted as a received timing signal 1584 in the wireless communication apparatus 2B, and a corrected timing signal 1594 is generated based on the received timing signal 1584.

Next, referring to FIG. 18, the timing signal adjusting part 12B detects that the timing signal 1545 has been inputted. Since the generation period of the timing signal 1545 does not overlap with the transmission interval of the transmission signal and the voltage level of the adjustment cause detection signal is low level, the timing signal 1545 is outputted as an adjusted timing signal 1565 as it is to the adjustment time information adding part 14A. Further, the adjusted timing signal 1565 is wirelessly transmitted as a transmission signal 1575 to the wireless communication apparatus 2B. The transmission signal 1575 is extracted as a received timing signal 1585 in the wireless communication apparatus 2B.

As described above, according to the present preferred embodiment, since the offset time To is set longer than the switchover period Tsw, the timing signal adjusting part 12B can set the adjustment time Ta (delay time in the present preferred embodiment) to a value within the offset time To even when the period during which the transmitting time adjustment cause exists is so long that the period extends over a plurality of timing signals. In addition, as compared with the fifth preferred embodiment, the switchover period Tsw needs not be estimated in the wireless communication apparatus 2B according to the present preferred embodiment.

In addition, when a transmitting time adjustment cause is detected by the adjustment cause detecting part 13 at the input timing of the timing signal, and when another adjusted timing signal is being wirelessly transmitted at the input timing of the timing signal, the timing signal transmitting part 30C generates the adjusted timing signal by adjusting the transmitting time of the timing signal by the adjustment time at the transmitting time at which the transmitting time adjustment cause does not exist and another adjusted timing signal is not being wirelessly transmitted. Therefore, the switchover timing between the display period of the video signal for the left eye and the display period of the video signal for the right eye can be reproduced in the wireless communication apparatus 2B at accuracy higher than that of the prior art.

In the present preferred embodiment, the adjustment time information adding part 14A outputs the transmission signal to the timing signal adjusting part 12B, however, the present invention is not limited to this. The adjustment time information adding part 14A may output the transmission signal to the signal detecting part 202. In this case, when the received signal intensity by the wireless receiving part 201 is equal to or larger than a predetermined threshold value or the transmission signal is inputted from the adjustment time information adding part 14A, the signal detecting part 202 generates an adjustment cause detection signal having the high level and representing that the transmitting time adjustment cause exists. Further, when the received signal intensity by the wireless receiving part 201 is smaller than the predetermined threshold value and the transmission signal is not being inputted from the adjustment time information adding part 14A, the signal detecting part 202 generates an adjustment cause detection signal having the low level and representing that no transmitting time adjustment cause exists.

In addition, the configuration of the present preferred embodiment may be applied to the first to fifth preferred embodiments.

Seventh Preferred Embodiment

Figure 19:
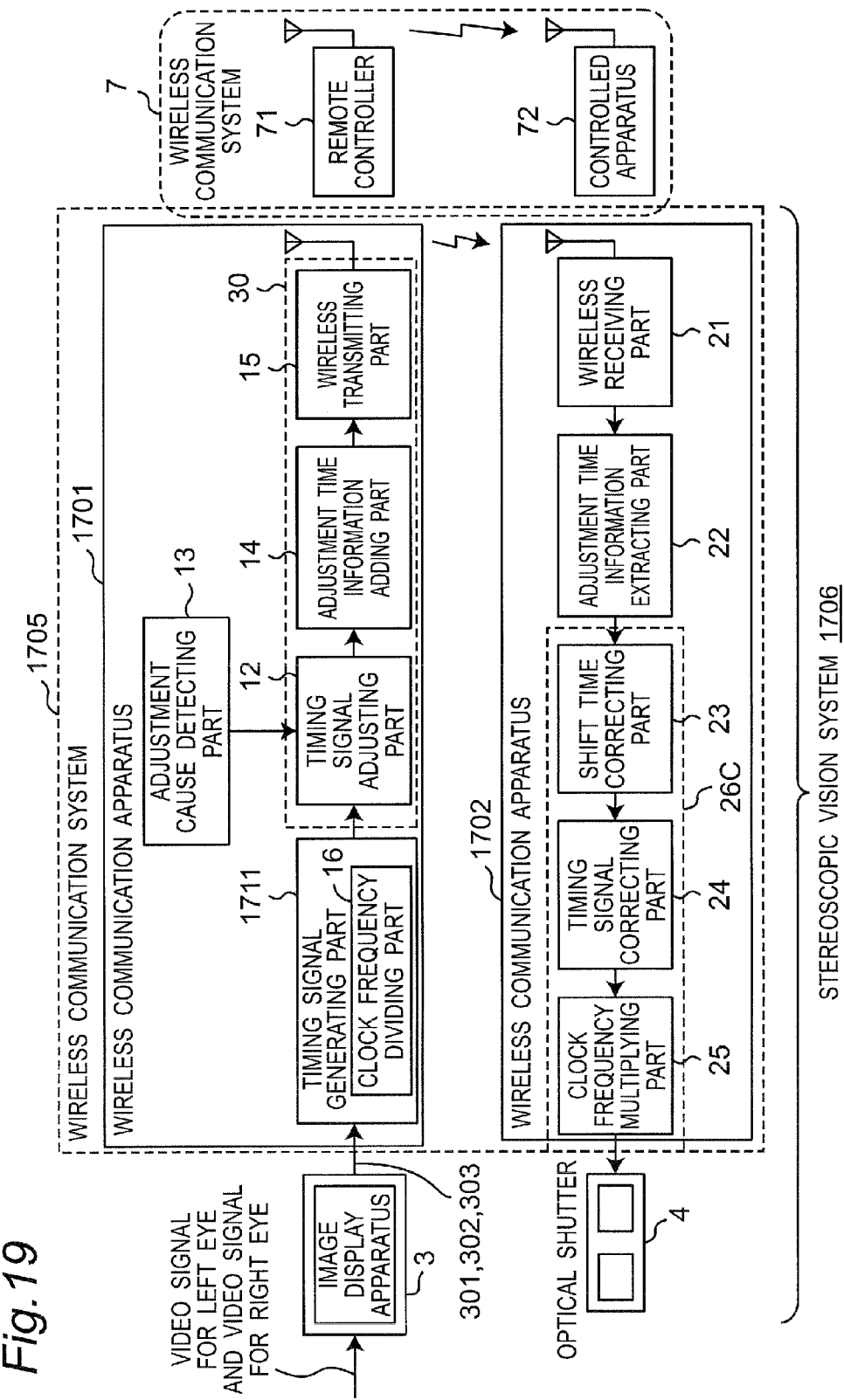
FIG. 19 is a block diagram showing a configuration of a stereoscopic vision system 1706 according to a seventh preferred embodiment of the present invention.
Figure 20:
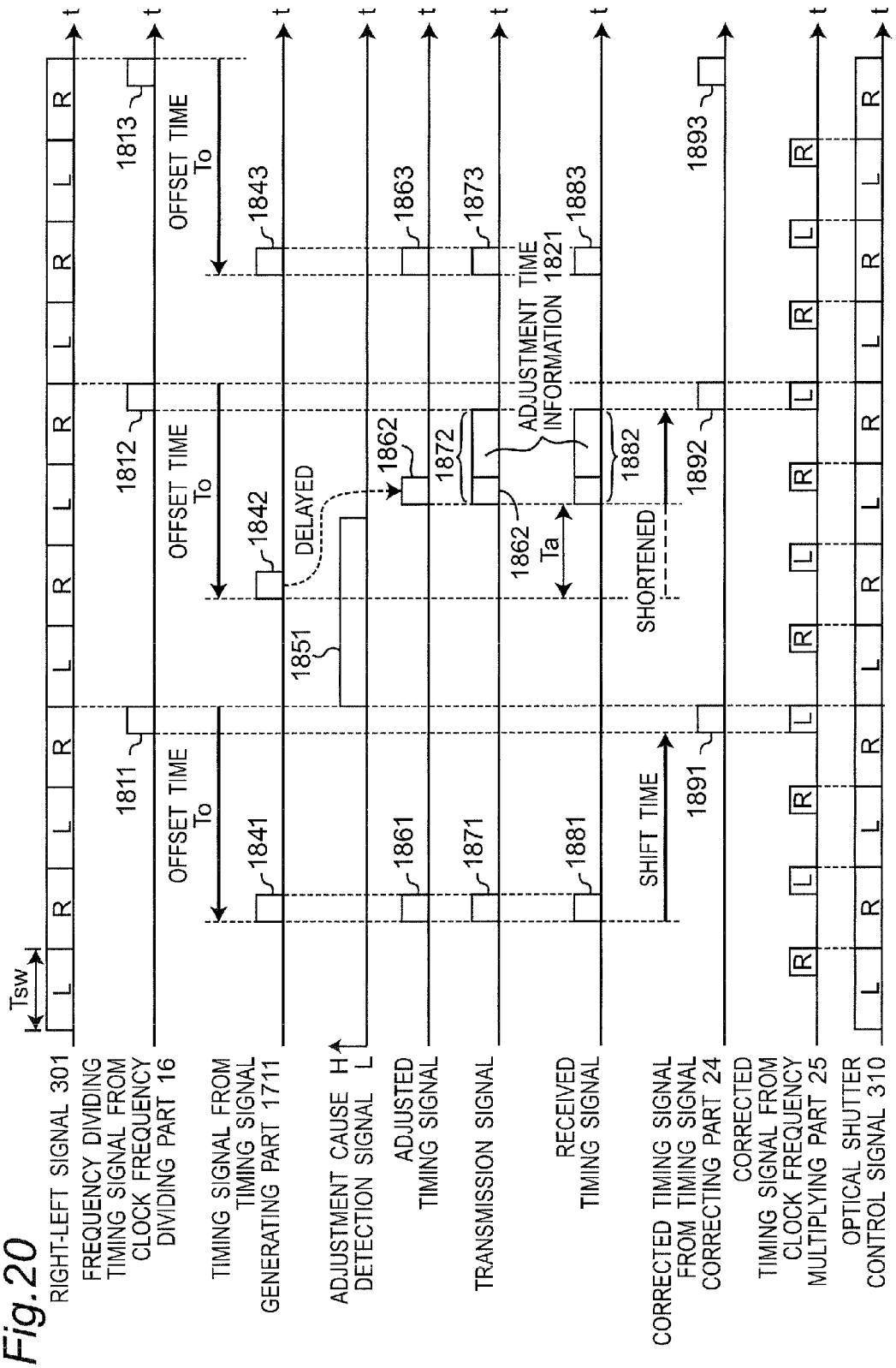
FIG. 20 is a timing chart showing operations of the stereoscopic vision system 1706 of FIG. 19.

FIG. 19 is a block diagram showing a configuration of a stereoscopic vision system 1706 according to the seventh preferred embodiment of the present invention. FIG. 20 is a timing chart showing operations of the stereoscopic is vision system 1706 of FIG. 19. It is noted that no description is provided for the vertical synchronizing signal 302 and the horizontal synchronizing signal 303 in FIG. 20 (See FIG. 4, for example). The present preferred embodiment is characterized in that a timing signal having a period longer than the switchover period Tsw is used.

Referring to FIG. 19, the stereoscopic vision system 1706 of the present preferred embodiment includes a wireless communication system 1705 in place of the wireless communication system 5 as compared with the stereoscopic vision system 6 of FIG. 1. In addition, the wireless communication system 1705 includes wireless communication apparatuses 1701 and 1702 in place of the wireless communication apparatuses 1 and 2 as compared with the wireless communication system 5. Further, the wireless communication apparatus 1701 includes a timing signal generating part 1711 in place of the timing signal generating part 11 as compared with the wireless communication apparatus 1. In addition, the wireless communication apparatus 1702 includes a corrected timing signal generating part 26C in place of the corrected timing signal generating part 26 as compared with the wireless communication apparatus 2. It is noted in the present preferred embodiment that components executing operations similar to those of the above-described preferred embodiments are denoted by the same reference numerals, and no description is provided for them.

Referring to FIG. 19, a clock frequency dividing part 16 is configured to include a counter that is, for example, a logic circuit. The clock frequency dividing part 16 generates a frequency divided timing signal that has a period longer than the switchover period Tsw based on the right-left signal 301, the vertical synchronizing signal 302 and the horizontal synchronizing signal 303 from the image display apparatus. Concretely speaking, the clock frequency dividing part 16 generates one frequency divided timing signal for a plurality of predetermined umber of switchover timings. For example, referring to FIG. 20, the clock frequency dividing part 16 generates one frequency divided timing signal (See frequency divided timing signals 1811 to 1813 of FIG. 20) every four switchover timings, which includes two switchover timings to the video signal for the left eye and two switchover timings to the video signal for the right eye.

In addition, referring to FIG. 19, the timing signal generating part 1711 generates a timing signal that precedes the frequency divided timing signal from the clock frequency dividing part 16 by the offset time To. For example, referring to FIG. 20, timing signals 1841 to 1843 are generated at timings that precedes the frequency divided timing signals 1811 to 1813 by the offset time To, respectively. In the present preferred embodiment, since the period of the timing signal is longer than that of first preferred embodiment, the offset time To can be set longer than the switchover period Tsw as shown in FIG. 20.

Further, referring to FIG. 19, the corrected timing signal generating part 26C is configured by further including a clock frequency multiplying part 25 that includes, for example, a phase locked loop (PLL) as compared with the corrected timing signal generating part 26 of FIG. 1. The corrected timing signal generating part 26C executes the corrected timing signal generating process of FIG. 3 by the shift time correcting part 23 and the timing signal correcting part 24 so as to generate a corrected timing signal. The clock frequency multiplying part 25 generates a corrected timing signal that represents the switchover timing from the video signal for the right eye to the video signal for the left eye and the switchover timing from the video signal for the left eye to the video signal for the right eye, based on the corrected timing signal from the timing signal correcting part 24, and outputs the generated corrected timing signal to the optical shutter 4. In the present preferred embodiment, the clock frequency multiplying part 25 generates four corrected timing signals for one corrected timing signal from the timing signal correcting part 24. The optical shutter 4 generates an optical shutter control signal 310 based on the corrected timing signal from the clock frequency multiplying part 25 in a manner similar to that of the first preferred embodiment.

With reference to FIG. 20, the operation of the stereoscopic vision system 1706 of FIG. 19 is described next. Referring to FIG. 20, an adjustment cause detection signal 1851 having the high level is generated from the end time of the frequency divided timing signal 1811 to the end time of the timing signal 1842. Referring to FIG. 20, the generation periods of the timing signals 1841 and 1843, do not overlap with the generation period of the adjustment cause detection signal 1851, and therefore, the timing signals 1841 and 1843 are outputted as adjusted timing signals 1861 and 1863 as they are, respectively. Further, the adjusted timing signals 1861 and 1863 are outputted as transmission signals 1871 and 1873 to the wireless transmitting part 15, respectively.

In addition, referring to FIG. 20, since the generation period of the timing signal 1842 overlaps with the generation period of the adjustment cause detection signal 1851, the timing signal adjusting part 12 generates an adjusted timing signal 1862 by setting the adjustment time Ta so that the adjusted timing signal 1862 is outputted after the end of the output of the adjustment cause detection signal 1851. Further, the adjustment time information adding part 14 generates a transmission signal 1872 by adding adjustment time information 1821 that includes the information on the adjustment time Ta to the adjusted timing signal 1862. The wireless transmitting part 15 converts the transmission signals 1871 to 1873 outputted from the adjustment time information adding part 14 into wireless signals, and wirelessly transmits the wireless signals to the wireless communication apparatus 1702.

Further, referring to FIG. 20, the transmission signals 1871 to 1873 are processed in a manner similar to that of the first preferred embodiment and extracted as received timing signals 1881 to 1883, respectively. Then, corrected timing signals 1891 to 1893 are generated based on the received timing signals 1881 to 1883, and are outputted to the clock frequency multiplying part 25. The clock frequency multiplying part 25 generates a corrected timing signal that represents the switchover timing from the video signal for the right eye to the video signal for the left eye and the switchover timing from the video signal for the left eye to the video signal for the right eye, based on the corrected timing signals 1891 to 1893 from the timing signal correcting part 24, and outputs the generated corrected timing signal to the optical shutter 4.

As described above, according to the present preferred embodiment, the timing signal generating part 1711 generates the timing signal that has a period longer than the switchover period Tsw, and therefore, the offset time To can be set longer than the switchover period. Therefore, even when the period during which the transmitting time adjustment cause exists is longer than the switchover period between the video signal for the left eye and the video signal for the right eye, it is possible to put the adjustment time Ta within the offset time To.

In the present preferred embodiment, the clock frequency dividing part 16 generates one frequency divided timing signal for every four switchover timings including two switchover timings to the video signal for the left eye and two switchover timings to the video signal for the right eye, however, the present invention is not limited to this. Preferably, the clock frequency dividing part 16 generates one frequency divided timing signal for every a plurality of combinations of the switchover timing to the video signal for the left eye and the switchover timing to the video signal for the right eye. In addition, the clock frequency multiplying part 25 generates the four corrected timing signals based on one corrected timing signal from the timing signal correcting part 24, however, the present invention is not limited to this. Preferably, the clock frequency multiplying part 25 generates the corrected timing signal of a plurality of combinations of the switchover timing to the video signal for the left eye and the switchover timing to the video signal for the right eye, based on one corrected timing signal from the timing signal correcting part 24.

In addition, the configuration of the present preferred embodiment may be applied to the first to sixth preferred embodiments.

Eighth Preferred Embodiment

Figure 21:
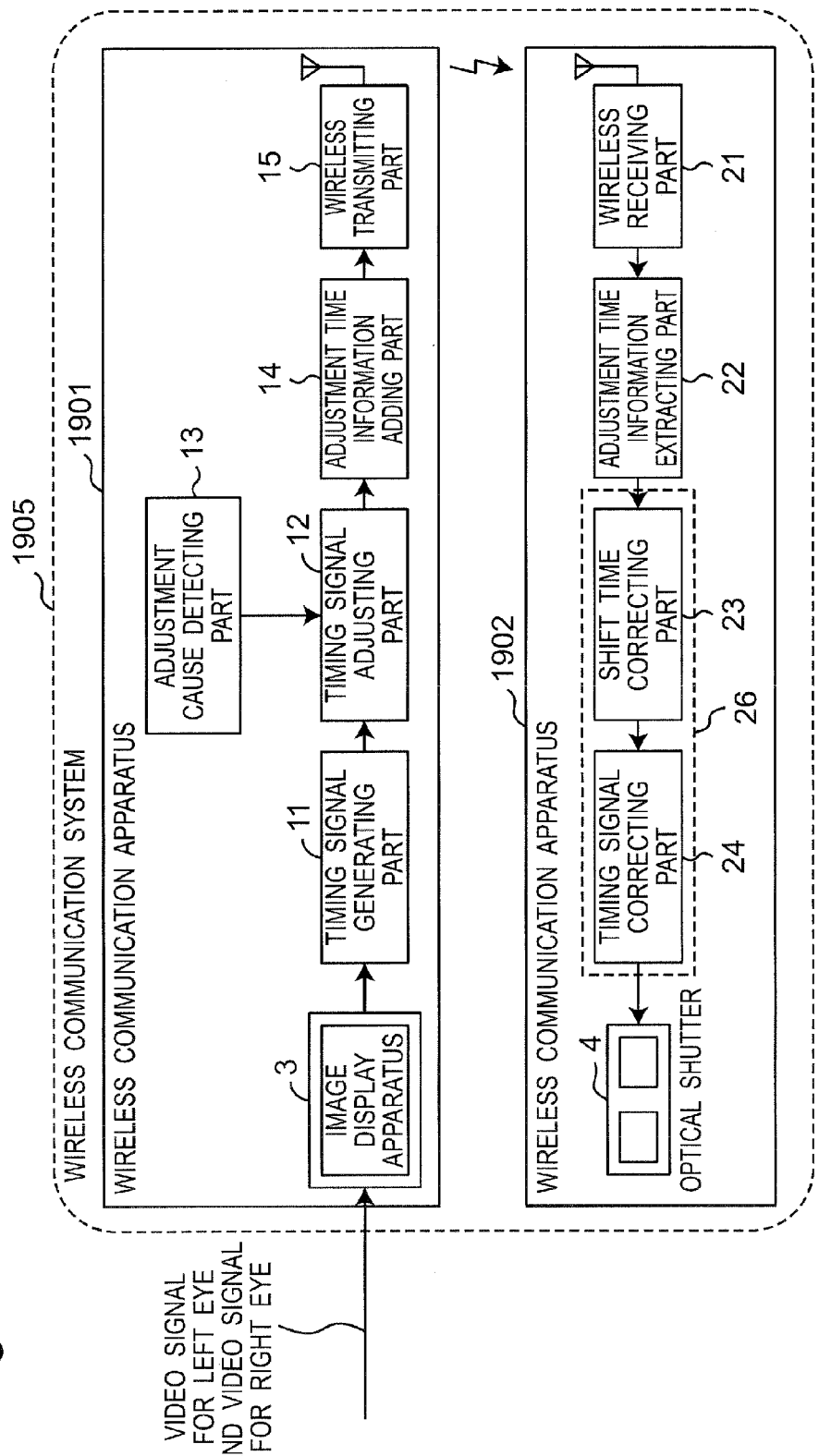
FIG. 21 is a block diagram showing a configuration of a wireless communication system 1905 according to an eighth preferred embodiment of the present invention.

FIG. 21 is a block diagram showing a configuration of a wireless communication system 1905 according to the eighth preferred embodiment of the present invention. In the above-described preferred embodiments, each of the wireless communication apparatuses 1, 701, 801, 1101, 1A, 1B and 1701 does not include the image display apparatus 3, however, the present invention is not limited to this. Each of the wireless communication apparatuses 1, 701, 801, 1101, 1A, 1B and 1701 may include the image display apparatus 3. In addition, in the above-described preferred embodiments, each the wireless communication apparatuses 2, 2A, 2B and 1702 does not include the optical shutter 4, however, the present invention is not limited to this. Each the wireless communication apparatuses 2, 2A, 2B and 1702 may include the optical shutter 4.

For example, referring to FIG. 21, the wireless communication system 1905 is configured to include wireless communication apparatuses 1901 and 1902. In this case, the wireless communication apparatus 1901 has a configuration in which the wireless communication apparatus 1 of the first preferred embodiment further includes the image display apparatus 3, and the wireless communication apparatus 1902 has a configuration in which the wireless communication apparatus 2 of the first preferred embodiment further includes the optical shutter 4. The wireless communication system 1905 exhibits action and advantageous effects similar to those of the wireless communication system 5 of the first preferred embodiment.

Ninth Preferred Embodiment

In the above-described preferred embodiments, the timing signal transmitting parts 30, 30A, 30B and 30C generate the transmission signal by adding the adjustment time information including the information on the adjustment time Ta to the adjusted timing signal only when the transmitting time of the timing signal from the timing signal generating part 11 or 11A is adjusted (delayed or advanced) by the adjustment time Ta, however, the present invention is not limited to this. The timing signal transmitting parts 30, 30A, 30B and 30C may add the adjustment time information that the adjustment time Ta is zero to the adjusted timing signal, and wirelessly transmit a resultant signal when the transmitting time adjustment cause is not detected at the input timing of the timing signal from the timing signal generating part 11 or 11A.

Figure 22:
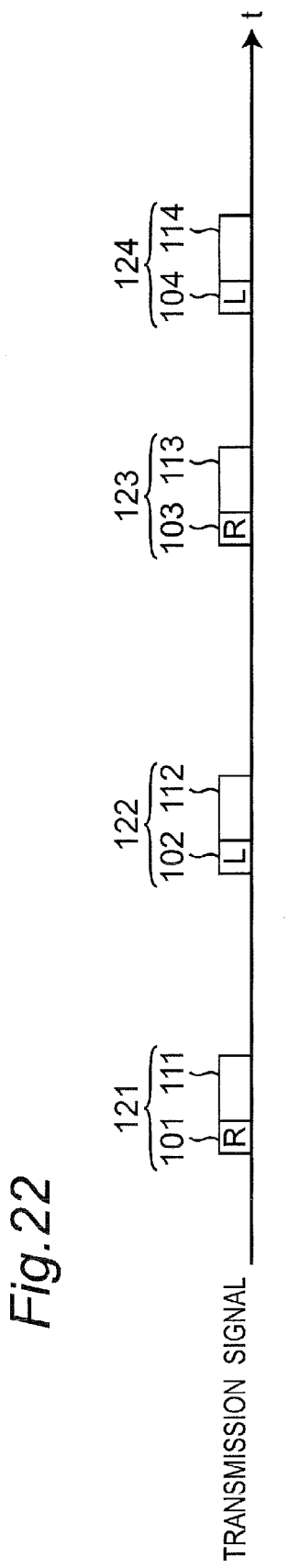
FIG. 22 is a timing chart showing a transmission signal according to a ninth preferred embodiment of the present invention.

FIG. 22 is a timing chart showing a transmission signal according to the ninth preferred embodiment of the present invention. Referring to FIG. 22, the adjustment time information 111 to 114 is added to all of the adjusted timing signals 101 to 104, respectively, to generate transmission signals 121 to 124. According to the present preferred embodiment, time required for the transmission of the transmission signal is increased as compared with the above-described preferred embodiments, however, the circuit can be simplified by eliminating the operational differences among the wireless communication systems 5, 5A, 5B, 7, 705, 805, 1105, 1705 and 1905 due to presence or absence of the adjustment time information.

In each of the above-described preferred embodiments, the adjustment time information is added subsequently to the adjusted timing signal, however, the present invention is not limited to this, and the information may be added before the adjusted timing signal.

In addition, in the above-described preferred embodiments, the timing signal transmitting parts 30, 30A, 30B and 30C convert the transmission signal including the adjusted timing signal and the adjustment time information into the wireless signal as one wireless packet, and wirelessly transmit the wireless signal, however, the present invention is not limited to this. The timing signal transmitting parts 30, 30A, 30B and 30C may convert the adjusted timing signal and the adjustment time information into separate wireless packets and wirelessly transmit the same packets. For example, the timing signal transmitting parts 30, 30A, 30B and 30C may convert the adjusted timing signal into a wireless signal as one wireless packet and wirelessly transmit the same wireless packet, and thereafter, convert the adjustment time information into a wireless signal as another wireless packet and wirelessly transmit the same wireless packet. In this case, the transmitting time of the adjusted timing signal is measured at the transmitting time of the adjusted timing signal, and the adjustment time information is wirelessly transmitted in the next packet based on the measurement result. Therefore, the adjusted timing signal and the adjustment time information can be wirelessly transmitted in an easier processing order as compared with those of the above-described preferred embodiments.

Further, in the above-described preferred embodiments, the timing signal transmitting parts 30, 30A, 30B and 30C generate the adjusted timing signal by is delaying or advancing timing signal, however, the present invention is not limited to this. The timing signal transmitting parts 30, 30A, 30B and 30C may generate the adjusted timing signal by adjusting the transmitting time of the timing signal by a predetermined adjustment time to a transmitting time at which no transmitting time adjustment cause exists, when the transmitting time adjustment cause is detected at the output timing of the timing signal.

Still further, the communication methods of the timing signal in the above-described preferred embodiments are not exclusive, and arbitrary communication methods may be executed in mutual combinations.

In addition, by using the adjustment cause detecting parts 13, 713, 813 and 813A in combinations, it is possible to cope with a plurality of transmitting time adjustment causes. Therefore, the information on the switchover timing between the video signal for the left eye and the video signal for the right eye can be wirelessly transmitted at higher accuracy.

Further, the present invention has been described by taking the stereoscopic image systems 6, 6A, 6B, 706, 806, 1106 and 1706 and the wireless communication system 1905 as examples in the above-described preferred embodiments, however, the present invention is not limited to this. The present invention can be applied to the wireless communication system, which includes a first wireless communication apparatus that wirelessly transmits a signal representing a predetermined control timing and a second wireless communication apparatus that wirelessly receives the signal.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

Industrial Applicability

As described above, the wireless communication apparatus of the present invention that is the first wireless communication apparatus generates the timing signal at the preceding timing preceding the predetermined control timing by the predetermined offset time. When the transmitting time adjustment cause is detected by the adjustment cause detecting part at the preceding timing, the first wireless communication apparatus generates the adjusted timing signal by adjusting a transmitting time of the timing signal to a transmitting time when the transmitting time adjustment cause does not exist, by a predetermined adjustment time, adds adjustment time information including information on the adjustment time to the adjusted timing signal, and wirelessly transmits a resultant signal to the second wireless communication apparatus. In addition, the wireless communication apparatus of the present invention that is the second wireless communication apparatus, wirelessly receives the adjusted timing signal, and generates the corrected timing signal that represents the control timing by shifting the wirelessly received adjusted timing signal by the shift time corresponding to the offset time. In addition, the second wireless communication apparatus corrects the shift time by the adjustment time included in the adjustment time information. Therefore, according to the first wireless communication apparatus, the second wireless communication apparatus, the wireless communication system and the wireless communication method of the present invention, the control timing information can be wirelessly transmitted from the first wireless communication apparatus to the second wireless communication apparatus at accuracy higher than that of the prior art even when the transmitting time adjustment cause of the timing signal exists.

The wireless communication system of the present invention is useful for realizing, for example, a stereoscopic vision system.

What is claimed is:

1. A first wireless communication apparatus comprising:
   a timing signal generating part configured to receive a control signal representing a predetermined control timing and to generate a timing signal having a transmission timing prior to the predetermined control timing by a predetermined offset time;
   a detecting part configured to detect whether a timing adjustment event for adjusting the transmission timing of the timing signal exists;
   a timing signal transmitting part configured to receive a detection result from the detecting part, wherein:
   when the detection result reflects that the timing adjustment event does not exist, the timing signal transmitting part is configured to transmit the timing signal to a second wireless communication apparatus, and
   when the detection result reflects that the timing adjustment event exists, the timing signal transmitting part is configured to (i) generate an adjusted timing signal by adjusting the transmission timing of the timing signal by a predetermined adjustment time to a transmission timing when the timing adjustment event does not exist, and (ii) transmit the adjusted timing signal to the second wireless communication apparatus.

2. The first wireless communication apparatus of claim 1, wherein:
   the control signal represents a display period of a left-eye image and a display period of a right-eye image,
   the detection part detects that the timing adjustment event exists when the detection part detects a wireless signal from a third wireless communication apparatus interfering with the timing signal, and
   when the detection part detects the wireless signal, the timing signal transmitting part is configured to transmit the adjusted timing signal and information associated with the predetermined adjustment time to the second wireless communication apparatus, the information associated with the predetermined adjustment time representing that the transmission timing of the timing signal is delayed.

3. The first wireless communication apparatus of claim 2, wherein:
   the first wireless communication apparatus constitutes a three-dimensional television, and
   the second wireless communication apparatus constitutes a three-dimensional glasses.

4. The first wireless communication apparatus of claim 1, wherein the detection part detects that the timing adjustment event exists when the detection part detects a wireless signal from a third wireless communication apparatus interfering with the timing signal.

5. The first wireless communication apparatus of claim 1, wherein:
   the detecting part includes a wireless receiving part and a signal detecting part,
   the wireless receiving part is configured to receive a wireless signal from a third wireless communication apparatus and output a signal representing an intensity of the wireless signal to the signal detecting part, and
   the signal detecting part is configured to detect whether the timing adjustment event exists based on the signal outputted by the wireless receiving part.

6. The first wireless communication apparatus of claim 1, wherein the detection part detects that the timing adjustment event exists when the detection part detects an audio signal to be transmitted by the first wireless communication apparatus.

7. The first wireless communication apparatus of claim 6, wherein the timing signal transmitting part is configured to wirelessly transmit the audio signal with the adjusted timing signal.

8. The first wireless communication apparatus of claim 1, wherein the detection part detects that the timing adjustment event exists when the detection part detects a transmission starting time for transmitting the generated timing signal is limited within a predetermined time interval due to a restriction on a design of the first wireless communication apparatus.

9. The first wireless communication apparatus of claim 1, wherein:
the control signal has a predetermined control period, and
the timing signal generating part is configured to generate a timing signal having a period the same as the control period.

10. The first wireless communication apparatus of claim 1, wherein:
the control signal has a predetermined control period, and
the timing signal generating part is configured to generate a timing signal that has a period longer than the control period.

11. The first wireless communication apparatus of claim 1, wherein the predetermined offset time is set to a time longer than the control period.

12. The first wireless communication apparatus of claim 1, wherein, when the detecting part detects that the timing adjustment event exists at the transmission timing and the timing adjustment event exists from a generating timing of a timing signal previous to the timing signal to be processed until a predetermined first elapsed time elapses, the timing signal transmitting part stops generating the adjusted timing signal corresponding to the timing signal to be processed.

13. The first wireless communication apparatus of claim 1, wherein, when the detecting part detects that the timing adjustment event exists at the transmission timing and when the timing signal transmitting part is wirelessly transmitting a second adjusted timing signal at the transmission timing, the timing signal transmitting part generates the adjusted timing signal by adjusting the transmission timing of the timing signal by the adjustment time to a transmitting time when the timing adjustment event does not exist and the second adjusted timing signal is not being wirelessly transmitted.

14. The first wireless communication apparatus of claim 1, wherein, when the timing adjustment event is not detected by the detecting part at the transmission timing, the timing signal transmitting part adds an adjustment time information indicating that an adjustment time is zero to the timing signal, and wirelessly transmits a resultant signal.

15. The first wireless communication apparatus of claim 1, wherein the timing signal transmitting part performs wireless transmission by using one of infrared rays, electromagnetic waves and ultrasonic waves.

16. The first wireless communication apparatus of claim 1, wherein:
the timing signal transmitting part transmits information associated with the predetermined adjustment time to the second wireless communication apparatus, and
the timing signal transmitting part converts the information associated with the predetermined adjustment time and the adjusted timing signal into separate wireless packets, and wirelessly transmits the wireless packets to the second wireless communication apparatus.

17. The first wireless communication apparatus of claim 1, further comprising an image display apparatus, wherein:
the control signal represents a display period of a video signal for a left-eye and a display period of a video signal for a right-eye for the image display apparatus connected to the first wireless communication apparatus, and
the control timing represents switchover timing between the video signal for the left eye and the video signal for the right eye.

18. A wireless communication system comprising a first wireless communication apparatus and a second wireless communication apparatus, the first wireless communication apparatus wirelessly transmitting a signal and the second wireless communication apparatus wirelessly receiving the signal, wherein:
the first wireless communication apparatus includes:
a timing signal generating part configured to receive a control signal representing a predetermined control timing and to generate a timing signal having a transmission timing prior to the predetermined control timing by a predetermined offset time;
a detecting part configured to detect whether a timing adjustment event for adjusting the transmission timing of the timing signal exists;
a timing signal transmitting part configured to receive a detection result from the detecting part and, when the detection result reflects that the timing adjustment event exists, to (i) generate an adjusted timing signal by adjusting the transmission timing of the timing signal by a predetermined adjustment time to a transmission timing when the timing adjustment event does not exist, and (ii) wirelessly transmit the adjusted timing signal and information associated with the predetermined adjustment time to the second wireless communication apparatus, and
the second wireless communication apparatus is configured to (i) wirelessly receive the adjusted timing signal and the information associated with the predetermined adjustment time, (ii) correct a shift time corresponding to the predetermined offset time by the predetermined adjustment time included in the information, and (iii) generate a corrected timing signal representing the predetermined control timing by shifting the wirelessly received adjusted timing signal by the shift time.

19. The wireless communication system of claim 18, wherein, when the second wireless communication apparatus does not receive a next adjusted timing signal before a predetermined second elapsed time elapses after generating the corrected timing signal, the second wireless communication apparatus generates a next corrected timing signal based on a period of corrected timing signals that have been generated.

20. The wireless communication system of claim 18, further comprising an image display apparatus and an optical shutter, wherein:
the control signal represents a display period of a video signal for a left-eye and a display period of a video signal for a right-eye for the image display apparatus connected to the first wireless communication apparatus,
the control timing represents switchover timing between the video signal for the left-eye and the video signal for the right-eye,
the second wireless communication apparatus outputs the corrected timing signal to the optical shutter that is connected to the second wireless communication apparatus and has a shutter for the left-eye and a shutter for the right-eye, and
the optical shutter controls opening and closing of the shutter for the left-eye and the shutter for the right-eye based on the corrected timing signal.

21. A wireless communication method comprising steps of:
receiving, at a first wireless communication apparatus, a control signal representing a predetermined control timing;
generating, at the first wireless communication apparatus, a timing signal having a transmission timing prior to the predetermined control timing by a predetermined offset time;

determining, at the first wireless communication apparatus, whether a timing adjustment event for adjusting the transmission timing of the timing signal exists;

upon determining that the timing adjustment event exists, generating an adjusted timing signal by adjusting the transmission timing of the timing signal by a predetermined adjustment time to a transmission timing when the timing adjustment event does not exist;

transmitting the adjusted timing signal along with information associated with the predetermined adjustment time from the first wireless communication apparatus to the second wireless communication apparatus;

receiving, at the second wireless communication apparatus, the adjusted timing signal and the information associated with the predetermined adjustment time;

correcting, at the second wireless communication apparatus, a shift time corresponding to the predetermined offset time by the predetermined adjustment time included in the information; and generating, at the second wireless communication apparatus, a corrected timing signal representing the predetermined control timing by shifting the adjusted timing signal by the shift time.

* * * * *